US008125928B2

(12) United States Patent
Mehta et al.

(10) Patent No.: US 8,125,928 B2
(45) Date of Patent: Feb. 28, 2012

(54) ROUTING FRAMES IN A SHORTEST PATH COMPUTER NETWORK FOR A MULTI-HOMED LEGACY BRIDGE NODE

(75) Inventors: Apurva Mehta, Cupertino, CA (US); Kumar Mehta, Cupertino, CA (US); Ramasamy Ramanathan, Santa Clara, CA (US); Krishna Sankaran, Milpitas, CA (US); Ramanarayanan Ramakrishnan, San Jose, CA (US); Shiva Shenoy, Los Altos, CA (US); Gopi Krishna, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 266 days.

(21) Appl. No.: 12/508,949

(22) Filed: Jul. 24, 2009

(65) Prior Publication Data

US 2011/0019678 A1    Jan. 27, 2011

(51) Int. Cl.
*H04L 12/28*    (2006.01)
(52) U.S. Cl. .................... 370/254; 370/389; 370/401
(58) Field of Classification Search .................. None
See application file for complete search history.

(56) References Cited

U.S. PATENT DOCUMENTS 6,275,492 B1    8/2001  Zhang
(Continued)

FOREIGN PATENT DOCUMENTS

EP    1705840 A1    9/2006
(Continued)

OTHER PUBLICATIONS

Interworking Task Group of IEEE, "IEEE P802.1ah/D4.2—Virtual Bridged Local Area Networks—Amendment 6: Provider Backbone Bridges", Mar. 26, 2008, pp. 1-116.

(Continued)

*Primary Examiner* — Robert Wilson
(74) *Attorney, Agent, or Firm* — Shumaker & Sieffert, P.A.

(57) ABSTRACT

Methods, apparatus, and products for routing frames in a shortest path computer network for a multi-homed legacy bridge, wherein the network includes a plurality of bridges. At least two of the plurality of bridges operate as edge bridges through which the frames ingress and egress the network. A first edge bridge identifies a legacy bridge nickname for a legacy bridge connected to the network through the first edge bridge and a second edge bridge using active-active link aggregation. The first bridge receives a frame from the legacy bridge and determines, in dependence upon the frame's destination node address, an egress bridge nickname for a third bridge through which a destination node connects to the network. The first bridge then adds the legacy bridge nickname and the egress bridge nickname to the frame and routes the frame to the third bridge in dependence upon the egress bridge nickname.

32 Claims, 9 Drawing Sheets

U.S. PATENT DOCUMENTS

| | | | |
|---|---|---|---|
| 7,688,756 | B2 | 3/2010 | Allan et al. |
| 7,787,480 | B1 * | 8/2010 | Mehta et al. .................. 370/401 |
| 2003/0161309 | A1 | 8/2003 | Karuppiah |
| 2007/0086361 | A1 | 4/2007 | Allan et al. |
| 2007/0165657 | A1 | 7/2007 | Smith et al. |
| 2007/0258446 | A1 | 11/2007 | Smith et al. |
| 2008/0089326 | A1 | 4/2008 | Kotrla et al. |
| 2008/0279196 | A1 | 11/2008 | Friskney et al. |
| 2009/0161669 | A1 | 6/2009 | Bragg et al. |
| 2009/0323706 | A1 | 12/2009 | Germain et al. |
| 2010/0080238 | A1 | 4/2010 | Allan et al. |
| 2010/0165995 | A1 * | 7/2010 | Mehta et al. .................. 370/400 |
| 2010/0284418 | A1 | 11/2010 | Gray et al. |
| 2010/0309912 | A1 * | 12/2010 | Mehta et al. .................. 370/390 |
| 2010/0322254 | A1 | 12/2010 | Takacs |
| 2011/0032936 | A1 | 2/2011 | Ashwood-Smith et al. |

FOREIGN PATENT DOCUMENTS

| | | |
|---|---|---|
| EP | 1 858 212 A1 | 11/2007 |
| EP | 2 001 172 A2 | 12/2008 |
| WO | WO 2008/076052 A1 | 6/2008 |
| WO | WO 2010/111142 A1 | 9/2010 |

OTHER PUBLICATIONS

IEEE Computer Society, "IEEE Std. 802.1D—2004; IEEE Standard for Local and metropolitan area networks Media Access Control (MAC) Bridges", Jun. 9, 2004, pp. 1-321.

IEEE Computer Society, "IEEE Std. 802.1ad—2005, IEEE Standard for Local and metropolitan area networks Virtual Bridged Local Area Networks, Amendment 4: Provider Bridges", May 26, 2006, pp. 1-281.

IEEE Computer Society, "IEEE Std. 802.1Q—2005, IEEE Standard for Local and metropolitan area networks Virtual Bridged Local Area Networks", May 19, 2006, pp. 1-74.

Radia Perlman, Sun Microsystems, Donald Eastlake 3rd, Stellar Switches, Dinesh G. Dutt, Silvano Gai, CISCO Systems, Anoop Ghanwani, Brocade, Jun. 26, 2009, RBridges: Base Protocol Specification, Internet Engineering Task Force, IETF; Standard Working Draft, Internet Society (ISOC) 4, Rue Des Falaises CH-1205 Geneva, Switzerland, Jun. 26, 2009, pp. 1-102.

Sofia, Rute C.: "A Survey of Advanced Ethernet Forwarding Approaches", IEEE Communications Surveys, IEEE, New York, NY, vol. 11, No. 1, Jan. 1, 2009, pp. 92-115.

D. Fedyk et al., "802.1aq Shortest Path Bridging May Recap", IEEE, May 18, 2009, entire document, 36 pp.

D. Fedyk, "802.1aq Shortest Path Bridging Design Implications", IEEE, Jul. 2007, entire document, 20 pp.

D. Fedyk et al., "802.1aq Shortest Path Bridging Recap and Status", IEEE, Jul. 2008, entire document, 17 pp.

M. Seaman, "Virtual Bridged Local Area Network: P802.1aq/D1.0: Revision", IEEE, Sep. 7, 2008, entire document, 21 pp.

D. Allan et al., "Provider Link State Bridging", IEEE Communication Magazine, Sep. 2008, entire document, 8 pp.

D. Fedyk et al., "Provider Link State Bridging (PLSB)", IEEE, Jan. 2007, entire document, 10 pp.

Office Action from U.S. Appl. No. 12/478,857, dated Apr. 13, 2011, 10 pp.

EPO Communication pursuant to Article 94(3) EPC mailed Sep. 8, 2011 in EP Application Serial No. 10250779.5, 5 pgs.

* cited by examiner

ROUTING FRAMES IN A SHORTEST PATH COMPUTER NETWORK FOR A MULTI-HOMED LEGACY BRIDGE NODE

CROSS-REFERENCE TO RELATED APPLICATION

This application is related to U.S. patent application Ser. No. 12/344,644 filed Dec. 29, 2008, which Applicants hereby incorporate by reference in its entirety.

This application is related to U.S. patent application Ser. No. 12/397,811 filed Mar. 4, 2009, which Applicants hereby incorporate by reference in its entirety.

This application is related to U.S. patent application Ser. No. 12/478,857 filed Jun. 5, 2009, which Applicants hereby incorporate by reference in its entirety.

TECHNICAL FIELD

The present invention relates to the field of computer networking, and in particular to a technique for routing frames in a shortest path computer network for an active-active multi-homed legacy bridge node.

BACKGROUND OF THE INVENTION

Early computer networks consisted of a small number of devices attached together using a single cable. Computer networks have since evolved, however, beyond a simple collection of attached devices. Current computer networks may connect thousands of devices spread across large local areas, and these local area networks may in turn be connected together to form still larger networks such as, for example, the Internet.

Today's computer networks often interconnect widely-disparate devices distributed throughout multiple local networks into a single virtual network. Virtual networking technology allows devices located on a single physical network to operate as part of multiple virtual networks. Such virtual networks provide flexibility not available in early computer networks and allow network administrators to create layers of abstraction to simplify complex network topologies. For example, using a virtual network, an enterprise may have a virtual blade server chassis with routers spread across multiple physical locations that allow a data center which is split across multiple sites to act as if the data center is at a single site.

The predominate standard used to construct and access today's computer networks is Ethernet. Ethernet is a family of frame-based computer networking technologies for local area networks. Ethernet is promulgated by Institute of Electrical and Electronics Engineers (IEEE) in various standards specifications as part of the IEEE 802 family of standards. Ethernet defines a number of wiring and signaling standards for the Physical Layer of the Open Systems Interconnection (OSI) Networking Model, the means for network access at the Media Access Control (MAC) and Data Link Layer, and a common addressing format. At the physical layer, Ethernet networks are ubiquitous, carrying all kinds of traffic over multiple types of physical connections (wired or wireless), including 10 Mbps, 100 Mbps, 1 Gbps, 10 Gbps, 100 Gbps connections. The Ethernet service layer, generally referred to as Layer-2 because it is the MAC and Data Link Layer in the OSI networking model, provides the services generally required by a network. These network services typically include filtering, replication, forwarding broadcast, unicast, and multicast (BUM) traffic, and following a serviced topology, which may include virtual local area networks (VLANs), ATM segments of VLANs based on the ATM Lane Standard (ELANs), Ethernet Private Lines (ELINEs), and rooted multipoint Ethernet virtual connections (ETREEs).

VLAN services are specified in the IEEE 802.1Q standard and allow enterprise customers to configure various computing devices to communicate as if those devices were attached to the same broadcast domain, regardless of their physical locations. VLANs provide segmentation services traditionally provided by routers in local area network (LAN) configurations and address issues such as scalability, security, and network management. Bridges in VLAN topologies enforce the integrity of VLAN broadcast domains because such bridges are not permitted to bridge network traffic between VLANs. In this way, VLANs may provide broadcast filtering, security, address summarization, and traffic flow management. Network administrators may use VLANs to create multiple Layer 3 networks on the same Layer-2 bridge. For example if a Dynamic Host Configuration Protocol (DHCP) server, which broadcasts its presence, were plugged into a bridge, the DHCP server would serve any host device connected to the bridge. By using VLANs, however, a network administrator may easily split up the devices on the network so that some hosts will not use that DHCP server and will default to link-local addresses.

Because enterprise customers often have multiple networks distributed across multiple physical sites, customer's typically connected these physically separate networks together through the network of a network provider. For example, a company may connect its network at site A to its network at site B through a network provided by a telecommunications company. Despite the customer networks being connected through a provider network, devices on the different customer networks may still use VLAN services to communicate through the provider's network as though the devices were all located on the same LAN.

For the same reasons that enterprise customers take advantage of the VLAN services described in the IEEE 802.1Q specification, network providers also take advantage of VLAN services to provide flexibility, security, traffic flow management, and reduce their network administration burden. The drawback, however, is that under the IEEE 802.1Q specification, there are only 4096 identifiers available to specify different VLANs. Thus, a network provider and all the customers that provider serves must share the 4096 VLAN identifiers.

Because industry participants deemed such a limited number of VLAN identifiers inadequate to meet the needs of both customers and providers, the IEEE 802.1Q standard was amended by the IEEE 802.ad standard, often referred to as "Q-in-Q" or "stacked VLANs." The IEEE 802.ad standard sets forth an architecture and bridge protocol to provide separate instances of MAC network services to multiple independent users of a provider network in a manner that does not require cooperation among the customers, and requires a minimum of cooperation between the customers and the provider of the MAC network service. Q-in-Q provides customers with the ability to configure their own VLANs inside the VLAN provided to the customer by a service provider. In such a manner, the service provider may configure one VLAN for the customer, and the customer can utilize that service provider VLAN to establish multiple customer VLANs.

In a manner similar to enterprise customers, network service providers often maintain multiple provider network domains, which are bridged together using a provider backbone bridging network. IEEE promulgates specifications for such a provider backbone bridging network in the IEEE 802.1ah standard. IEEE 802.1ah compliant networks provide complete separation of customer and service provider domains by encapsulating Ethernet frames with a service provider MAC header. Because the Ethernet frames are originally encapsulated in the customer network with a customer MAC header, this subsequent encapsulation with a service provider MAC header is often referred to as 'MAC-in-MAC encapsulation.' Using MAC-in-MAC encapsulation, Ethernet frames being sent in a customer's network from one domain to another through multiple service provider network domains contain two MAC headers. The customer MAC header provides routing information to the bridges in the customer's networks, while the service provider MAC header provides routing information to the bridges in the service provider's backbone bridging network.

To provide an overview of Ethernet header stacking of encapsulation, FIG. 1 sets forth a line drawing that illustrates exemplary Ethernet frame structures compliant with the IEEE 802.1 family of standards. FIG. 1 illustrates a traditional Ethernet frame 100 implemented in a customer's network according to the IEEE 802.1D standard. The customer frame 100 consists of a payload 101, a header type (EthType) 102 indicating that frame 100 is an 802.1D frame, a customer network source MAC address (C-SA) 103, and a customer network destination MAC address (C-DA) 104. The customer network source MAC address 103 specifies the source node in the customer network that originates the frame 100, while the customer network destination MAC address 104 specifies the destination node in the customer network to which the frame is bound for delivery.

As mentioned above, a customer may organize the nodes into various VLANs to provide traffic flow management, security, ease network administration, and the like. VLANs established by a customer for use within the customer's networks are generally referred to a 'customer VLANs.' In a network using customer VLANs, frame 100 is encapsulated as frame 110 to include a customer VLAN identifier (C-VID) 115 and a new header type (EthType) 116, indicating that the frame 110 is an 802.1Q frame. As used in this application, encapsulation may allow additional fields to be placed in any position relative to the encapsulated object, including interior to the original object, and does not require the additional fields be placed surrounding or at either end of the encapsulated object.

In a provider bridge (PB) network that bridges two customer networks, the frame 110 is further encapsulated as shown by frame 120, adding new fields for: a service VLAN identifier (S-VID) 127, and a new header type (EthType) 128 indicating the frame 120 is IEEE 802.1ad compliant. In a provider backbone bridging (PBB) network that bridges multiple PB networks, the frame 120 is further encapsulated to add additional fields for: a service identifier (I-SID) 131, a new header type (EthType) 132 corresponding to the service identifier 131, a backbone VLAN identifier 133, an additional header type (EthType) 134 indicating that the frame 130 is IEEE 802.1ah compliant, a backbone source MAC address (B-SA) 135 specifying the bridge through which the frame ingresses into the PBB network, and a backbone destination MAC address (B-DA) 136 specifying the bridge through which the frame egresses the PBB network.

For further explanation of header stacking or encapsulation in a IEEE 802.1ad provider bridge network, FIGS. 2 and 3 set forth network diagrams that illustrate an exemplary provider bridge network 200 interconnecting exemplary networks for customers A and B (201 and 202, respectively). In FIGS. 2 and 3, customer A 201 maintains three networks 203, 205, 207, while customer B 202 maintains two networks 204, 206. The provider bridge network 200 consists of six bridges, four provider edge bridges (PEB) 1-4 and two provider core bridges (PCB) 1-2. An edge bridge is a bridge through which frames ingress and egress the network 200—that is, an edge bridge is positioned at the 'edge' of the network topology. A core bridge is a bridge used to interconnect one or more edge bridges.

FIG. 2 illustrates a frame 220 at several stages as the frame 220 traverses the networks of FIG. 2 from customer equipment (CE)-11 210 in network 203 of customer A 201 to CE-31 212 in network 205 of customer A 201. In FIG. 2, the communications between CE-11 210 and CE-31 212 are implemented using a customer VLAN, and so the frame 220a from CE-11 210 is encapsulated with a customer VLAN header 230 that includes a customer VLAN identifier (C-VID) and a header type (EthType) specifying that the frame 220a is an IEEE 802.1Q compliant frame. The frame 220 includes a source MAC address (CE-11-SA) for CE-11 210, which indicates that CE-11 210 originated the frame (220a), and a destination MAC address (CE-31-DA) for CE-31 212, which indicates that the frame 220 is destined for CE-31 212.

When provider edge bridge (PEB)-1 240 receives the frame 220a, PEB-1 240 encapsulates the frame 220a into an 802.1ad frame 220b by adding a service VLAN header 231 to the frame 220. The service VLAN header 231 includes a service VLAN identifier (S-VID-A) assigned by the provider to customer A 201 and a header type (EthType) specifying that the frame is IEEE 802.1ad compliant. Using the service VLAN identifier to identify devices in the networks 203, 205, 207 of customer A 201, the provider bridges learn information about the MAC addresses of the computing devices in customer A's networks. From the learned MAC information, the provider bridges route the frame 220 through the provider network 200 from the PEB-1 240 through which the frame 220 ingresses the network 200 to the PEB-3 242 through which the frame 220 egresses the network 200. PEB-3 242 then de-encapsulates the frame 220b by removing to service VLAN header 231, leaving IEEE 802.1Q compliant frame 220a for delivery to CE-31 212.

Similarly, in FIG. 3, computing device CE-15 310 in network 204 of customer B 202 sends an IEEE 802.1Q compliant frame 320a to device CE-25 312 customer B's network 206. At PEB-1 240, frame 320a is encapsulated with a service VLAN header 331. The service VLAN header 331 includes a service VLAN identifier (S-VID-B) assigned by the service provider to customer B 202 and a header type (EthType) specifying that the frame is IEEE 802.1ad compliant. The ingress bridge 240 of the provider network 200 forwards the frame 320b to the egress bridge 342 of the provider network 200, which in turn de-encapsulates the frame 320b by removing the service VLAN header 331, leaving IEEE 802.1Q compliant frame 320a for delivery to CE-35 312. As the provider bridges receive various frames on their ports, the bridges learn the MAC addresses of the devices in customer B network by monitoring the MAC addresses associated with each service VLAN identifier assigned to customer B 202 by the network provider.

From the description above, readers will note that in a provider bridge network, the service provider uses one or more SVLANs to transport frames for a customer's VLANs between multiple customer networks. To determine the forwarding path for each service VLAN through the provider's bridge network, the provider bridges often use the Generic VLAN registration protocol (GVRP) or the Multiple VLAN Registration Protocol (MVRP). For multicast traffic containment, provider bridges may use the Generic Attribute Registration Protocol Multicast Registration Protocol (GMRP) or the Multiple Multicast Registration Protocol (MMRP). For purposes of forwarding traffic, provider edge bridges learn all customer equipment MAC addresses and forward customer frames based on the service VLAN identifier and customer VLAN identifier pairs, while provider core bridges learn all customer equipment MAC addresses, but forward customer frames based only on the service VLAN identifiers. Within a particular provider bridge network, a given customer equipment MAC address is at the same site for all service VLANs.

Even with the stacked VLAN protocols, provider bridge networks have scaling problems. Because only 4,096 service VLAN identifiers are available under current protocols, provider bridge networks are limited in the number of customer networks they can serve effectively and efficiently. Further, because provider bridges learn the MAC addresses for all customer devices, scaling issues often arise when a provider serves one or more customers with large virtual networks. In addition, there is a potential for interaction between customer and service provider control protocols.

Provider Backbone Bridge (PBB) networks are one attempt to alleviate these issues because PBB networks allow a service provider to partition a large provider bridge network into several smaller provider bridge networks that are interconnected by the PBB network. For further explanation, FIG. 4 sets forth a network diagram that illustrates an exemplary provider backbone bridge network 400 interconnecting exemplary provider bridge networks 410, 420, 430. The PBB network 400 of FIG. 4 consists of four provider backbone edge bridges (BEB)—that is, BEB-11 416, BEB-12 418, BEB-21 434, and BEB-22 436—and two provider backbone core bridges (BCB)—that is, BCB-1 401 and BCB-2 402.

FIG. 4 illustrates a frame 412 at several stages as the frame 412 traverses the networks of FIG. 4 from customer equipment (CE)-11 411 to CE-34 431. The customer utilizing the PB networks 410, 430 and the PBB network 400 has grouped CE-11 411 and CE-34 431 in the same customer VLAN. Thus, frame 412a from CE-11 411 includes a customer VLAN header 415. The customer VLAN header 415 includes the customer VLAN identifier (C-VID) assigned by the customer for the customer VLAN and a header type (EthType) that specifies that the frame 412a is IEEE 802.1Q compliant.

When the frame 412a reaches the provider edge bridge (PEB)-11 413, PEB-11 413 encapsulates the frame with a service VLAN header 417. The service VLAN header 417 includes the service VLAN identifier (S-VID) assigned to the customer by the network provider and a header type (EthType) that specifies that the frame 412a is IEEE 802.1ad compliant.

When the frame 412b reaches the provider backbone edge bridge (BEB)-11 416, BEB-11 416 encapsulates the frame with a backbone header 419. The backbone header 419 includes a service identifier (I-SID), a new header type (EthType) corresponding to the service identifier, a backbone VLAN identifier, an additional header type (EthType) indicating that the frame 412c is IEEE 802.1ah compliant, a backbone source MAC address (BEB-11-SA) specifying the backbone edge bridge through which the frame ingresses into the PBB network 400, and a backbone destination MAC address (BEB-22-DA) specifying the backbone edge bridge 436 through which the frame egresses the PBB network 400.

The frame 412c is routed through the provider backbone bridge network 400 from the ingress bridge, BEB-11 416, to the egress bridge, BEB-22 436. BEB-22 436 de-encapsulates the frame 412c by removing the backbone header 419, leaving the frame 412 IEEE 802.1ad compliant. BEB-22 436 then sends the frame 412 along to PEB-31 433 in the IEEE 802.1ad compliant provider bridge network 430. PEB-31 433 further de-encapsulates the frame 412 by removing the service VLAN header 417, leaving the frame 412 IEEE 802.1Q compliant. PEB-31 433 then forwards the frame 412 along to CE-34 431 for delivery.

In a provider backbone bridge network, readers will note that there is clear demarcation between customer and service provider domains. MAC address learning for customer equipment is limited to the provider edge bridge, and the I-SID field allows separation of Ethernet as a service from Ethernet as infrastructure.

As mentioned above, the networking architectures described by the IEEE 802.1Q, 802.1ad, and 802.1ah standards allow enterprise customers to establish multiple networks that are geographically dispersed, yet operate as a single virtual network. These physically separate LANs communicate through PB and PBB networks using forwarding trees established using a spanning tree protocol. The spanning tree protocol is an OSI Layer-2 protocol that ensures a loop-free topology for any bridged LAN. This protocol allows a network design to include spare (redundant) links to provide automatic backup paths if an active link fails, without the danger of bridge loops, or the need for manual enabling or disabling of these backup links. Bridge loops must be avoided because such loops result in traffic that floods the network. The spanning tree protocol is defined in the IEEE 802.1D standard, and, as the name suggests, it creates a spanning tree within a mesh network of connected Layer-2 bridges, and disables those links that are not part of the tree, leaving a single active path between any two network nodes.

There are certain disadvantages to the spanning tree protocol used in the networks described above with reference to FIGS. 1-4. Because the spanning tree protocol disables links that are not part of the forwarding tree, bottlenecks are often created by concentrating traffic onto selected links. Also, due to the nature of the spanning tree protocol, temporary loops may develop if spanning tree messages are lost or as the network topology changes because nodes are brought on-line or taken off-line or moved in the network. During periods when temporary loops exists, frames may flood the network because the standard Ethernet header does not contain a time-to-live field or hop count that specifies when a frame has become stale and should be discarded. Further, the paths developed between nodes of the network are not necessarily the pair-wise shortest path, but rather are the paths that remain after the spanning tree protocol eliminates redundant paths.

In an attempt to create a network solution without the disadvantages of the spanning tree protocol, the Internet Engineering Task Force (IETF) has developed additional protocols. One such protocol is the "Transparent Interconnection of Lots of Links" (TRILL) protocol. The TRILL protocol and other similar specifications require the use of router-bridges (R-Bridges) to route frames hop-by-hop through the network along the shortest path to the frames destination in the network, e.g., the network's edge bridge. For further explanation, FIG. 5 sets forth a network diagram that illustrates an exemplary TRILL network 500, also known as a router-bridge network, because the devices behave as both a router and a bridge at the ISO Layer-2 level. The TRILL network 500 includes three core router-bridges (CRB)—that is, CRB-4 540, CRB-5 542, and CRB-6 544—as well as five edge router-bridges (ERB)—that is, ERB-1 530, ERB-2 532, ERB-8 534, ERB-9 536, and ERB-7 538. The TRILL network 500 is provided to customers by a network provider. The edges of the TRILL network 500 typically extend into the datacenter where the customer equipment is housed. In fact, often each equipment rack includes a bridge that operates as an edge of the TRILL network 500. These TRILL networks can extend throughout one or more datacenters to interconnect various networks.

The TRILL network 500 of FIG. 5 interconnects two IEEE 802.1Q networks 510, 520. 802.1Q network 510 is connected to the TRILL network 500 through ERB-1 530. 802.1Q network 520 is connected to the TRILL network 500 through ERB-8 534 and ERB-9 536. 802.1Q network 510 includes a legacy bridge (LB)-55 514 and a LB-56 515, neither of which support MAC-in-MAC encapsulation or are TRILL compliant. 802.1Q network 520 includes EB-85 524 and EB-96 526. End point devices include customer equipment (CE)-11 512 connected to LB-55 514, CE-31 522 connected to EB-85 524, and CE-77 539 connected to ERB-7 538. End point devices CE-11 512, CE-31 522, and CE-77 539 can be any type of computing device, including workstations, servers, network devices, and so on.

FIG. 5 illustrates a frame 518 at several stages as the frame 518 traverses the networks of FIG. 5 from CE-11 512 to CE-31 522. The customer utilizing the TRILL network 500 to bridge multiple 802.1Q networks has grouped CE-11 512 and CE-31 522 in the same customer VLAN. Thus, frame 518a sent by LB-55 514 for CE-11 512 includes a customer VLAN header 519. The customer VLAN header 519 includes the customer VLAN identifier (C-VID) assigned by the customer for the customer VLAN and a header type (EthType) that specifies that the frame 518a is IEEE 802.1Q compliant.

When the frame 518a reaches the ERB-1 530, ERB-1 530 encapsulates the frame 518 with a TRILL header 551. The TRILL header 551 includes a TRILL source nickname (ERB-1-SN) specifying ERB-1 as the ingress edge router-bridge for the frame 518, a TRILL destination nickname (ERB-8-DN) specifying ERB-8 534 as the egress edge router-bridge for the frame 518, various TRILL flags, a hop count, and a header type (EthType) indicating that frame 518b is a TRILL frame. TRILL nicknames are assigned to every router-bridge in a TRILL network using a dynamic nickname acquisition protocol or other protocols as will occur to those of skill in the art.

ERB-1 530 also encapsulates the frame 518 with an Ethernet MAC header 552. The MAC header 552 includes a outer transport VLAN identifier (OT-VLAN-ID), a header type (EthType), a source MAC address (ERB-1-SA) specifying ERB-1 530 as the node transmitting the frame 518b on the next network hop through the network 500, and a destination MAC address (CRB-5-DA) specifying CRB-5 542 as the node receiving the frame 518b on the next network hop through the network 500. ERB-1 530 then sends the frame 518 to CRB-5 542, which routes the frame through the TRILL network 500 to CRB-4 540 based on a shortest path to ERB-8 534. As the frame traverses the TRILL network 500, the MAC header 552 is changed at each hop to update the source and destination MAC addresses for the next network hop. Accordingly, when the frame 518c passes from CRB-4 540 to ERB-8 534, the frame 518 includes MAC header 562. The MAC header 562 of FIG. 5 includes a source MAC address (CRB-4-SA) specifying CRB-4 540 as the node transmitting the frame 518c on the next network hop through the network 500 and a destination MAC address (ERB-8-DA) specifying ERB-8 534 as the node receiving the frame 518c on the next network hop through the network 500. Upon receiving the frame 518c, ERB-8 534 de-encapsulates the frame 518 by removing the MAC header 562 and the TRILL header 551, leaving frame 518a for delivery to CE-31 522 through EB-85 524.

Readers will note that the TRILL network 500 operates as a massive switch fabric from the perspective of the customer network. Frames enter the TRILL network at an ingress bridge and are routed along the shortest path hop-by-hop through the TRILL network to an egress bridge for delivery to a customer network. As the bridges in the TRILL network learn the MAC address of the customer equipment in the customer networks to which the TRILL bridges connect, the TRILL bridges share information among one another about which customer MAC addresses are related to which TRILL bridge nickname. ISO Layer-2 frames with known unicast addresses are routed hop-by-hop based on TRILL nicknames of the ingress and egress edge router-bridges by the transit or core router-bridges. ISO Layer-2 multicast traffic can also be routed hop-by-hop based on multicast distribution trees. In addition to TRILL, there are other provider bridging protocols such as Shortest Path Provider Backbone Bridging (SP-PBB) described in IEEE 802.1aq that represent attempts by industry participants to utilize the shortest path through the network to forward frames between edge bridges.

Regardless of whether the TRILL protocol or the SPPBB protocol is used to implement a particular shortest path network, both protocols require that network bridges support MAC-in-MAC encapsulation. These protocols use the additional Ethernet header—that is, Ethernet header 552 of FIG. 5—to route the frame within a network along the shortest path from the bridge through which the frame ingressed the network to the bridge through which the frames egresses the network.

Legacy bridges, however, do not support MAC-in-MAC encapsulation and cannot properly form frames for use in shortest path networks such as TRILL network 500. In order to carry traffic from and to the legacy bridges 514 and 515 across the TRILL network 500, edge bridge 530 operates as an appointed-forwarder that interacts with the other bridges of the TRILL network 500 for the VLANs on network 510. The drawback to this arrangement, however, is that edge bridge 530 becomes a single point of failure for all traffic to and from the 802.1Q network 510 when operating as an appointed-forwarder for those VLANs. The edge bridge 530 may also becomes a bottleneck for network traffic between the legacy bridges in the 802.1Q network 510 and the TRILL network 500. Thus, such a configuration decrease overall reliability and efficiency.

BRIEF SUMMARY OF THE INVENTION

Methods, apparatus, and products are disclosed for routing frames in a shortest path computer network for a multi-homed legacy bridge node, which is connected in an active-active manner to at least two edge bridges. The legacy bridge node is multi-homed to two or more edge bridge nodes in the shortest path network while one of those edge bridge nodes operates a proxy-node for the legacy bridge node within the shortest path network. This configuration advantageously allows the legacy node to be represented in the network by a single edge bridge while being connected to a shortest path network by active-active links to multiple edge bridges. Such a configuration increases reliability of the communications between the legacy bridge node and shortest path network.

Moreover, utilizing embodiments of the present invention prevents MAC movements in the bridges of a shortest path bridging network, which may occur when a legacy bridge is multi-homed to such a network using active-active links. Further, embodiments of the present invention facilitate:

Reaching All MACs behind a legacy-bridge over a shortest-path from all other edge bridges of a shortest path bridging network; and Traffic originating from source nodes behind a legacy bridge to traverse a shortest-path to reach destination nodes behind other edge bridges of a shortest path bridging network.

In accordance with embodiments of the present invention, the network in which frames are routed includes a plurality of bridge nodes. At least two of the plurality of bridge nodes operate as edge bridge nodes through which the frames ingress and egress the computer network. In some embodiments of the present invention, a first edge bridge node may operate as an ingress bridge node. The first edge bridge node identifies a legacy bridge nickname for a legacy bridge node. The legacy bridge node connects to the network through the first edge bridge node and a second edge bridge node using link aggregation—that is, the legacy bridge node is multi-homed to the first edge bridge node and the second edge bridge node. The first edge bridge node receives a frame from the legacy bridge node. The frame specifies a source node address for a source node originating the frame and a destination node address for a destination node to which the frame is transmitted. The source node connects to the network through the legacy bridge and the first or second edge bridge nodes. The destination node connects to the network through a third edge bridge node. The first edge bridge node determines, in dependence upon the destination node address, an egress bridge nickname for the third edge bridge node through which the destination node connects to the network. The first edge bridge node adds the legacy bridge nickname and the egress bridge nickname to the frame and routes the frame to the third edge bridge node through which the destination node connects to the network in dependence upon the egress bridge nickname.

In accordance with other embodiments of the present invention, a first edge bridge node may operate as an egress bridge node. The first edge bridge node identifies a legacy bridge nickname for a legacy bridge node. The legacy bridge node connects to the network through the first edge bridge node and a second edge bridge node using link aggregation. The first edge bridge node receives a frame for routing to the legacy bridge node. The frame specifies a source node address for a source node originating the frame and a destination node address for a destination node to which the frame is transmitted. The source node connects to the network through a third edge bridge node. The destination node connects to the network through the legacy bridge and the first or second edge bridge node. The frame also includes the legacy bridge nickname for the legacy bridge node and an ingress bridge nickname for the third edge bridge node. The first edge bridge node removes the legacy bridge nickname and the ingress bridge nickname from the frame and routes the frame to the legacy bridge node for delivery to the destination node.

BRIEF DESCRIPTION OF THE SEVERAL VIEWS OF THE DRAWINGS

The accompanying drawings, which are incorporated in and constitute a part of this specification, illustrate implementations consistent with the present invention and, together with the detailed description, serve to explain advantages and principles consistent with the invention.

DETAILED DESCRIPTION OF THE INVENTION

While certain exemplary embodiments are described in detail and shown in the accompanying drawings, it is to be understood that such embodiments are merely illustrative of and not devised without departing from the basic scope thereof, which is determined by the claims that follow.

Although the following disclosure is discussed using terminology related to Ethernet links, various IEEE 802 standards and TRILL, these are merely by way of example and illustration, and the scope of the present invention is not so limited, but extends to the fullest scope defined by the claims herein.

Figure 1:
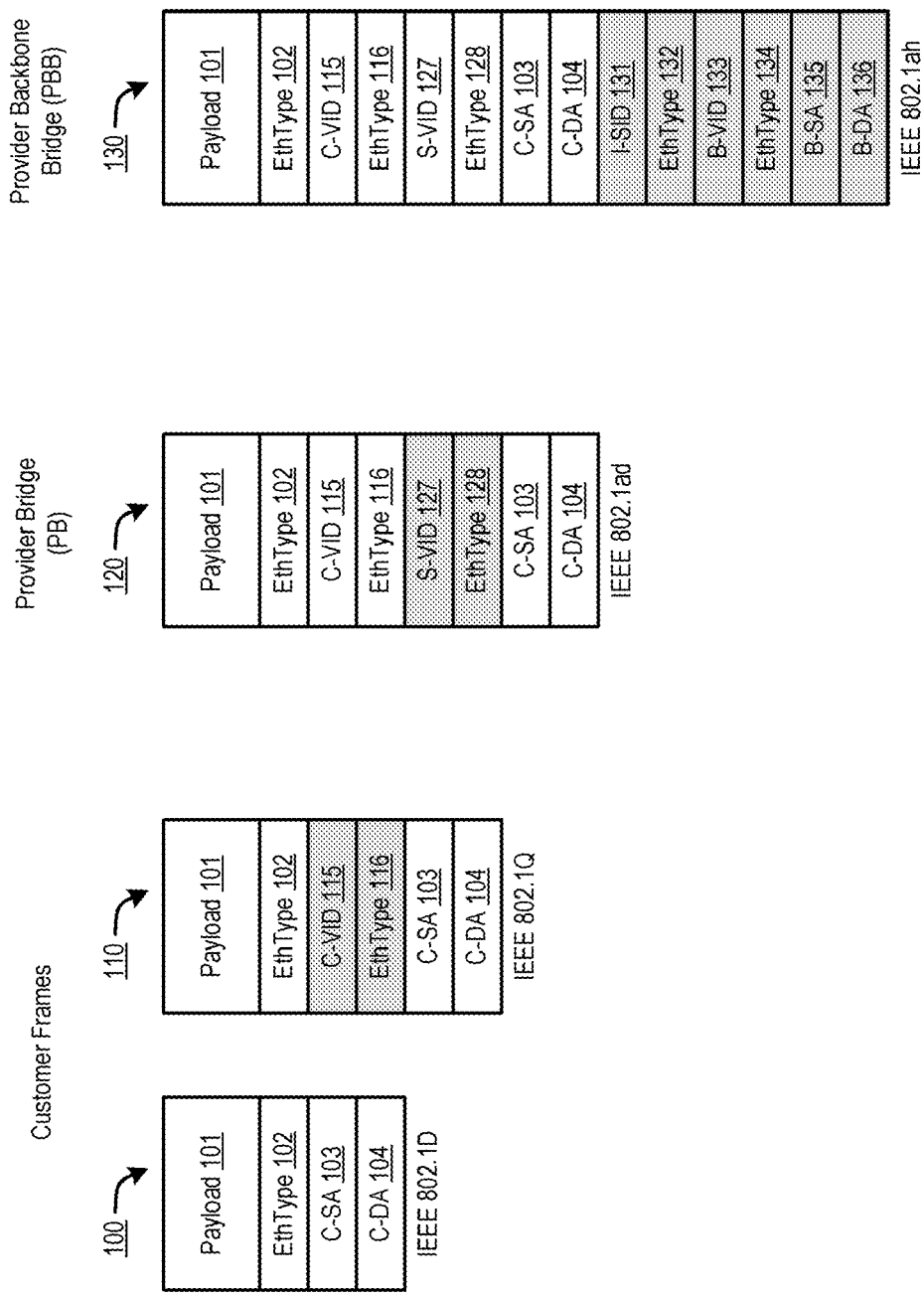
FIG. 1 sets forth a line drawing that illustrates exemplary Ethernet frame structures compliant with the IEEE 802.1 family of standards.
Figure 2:
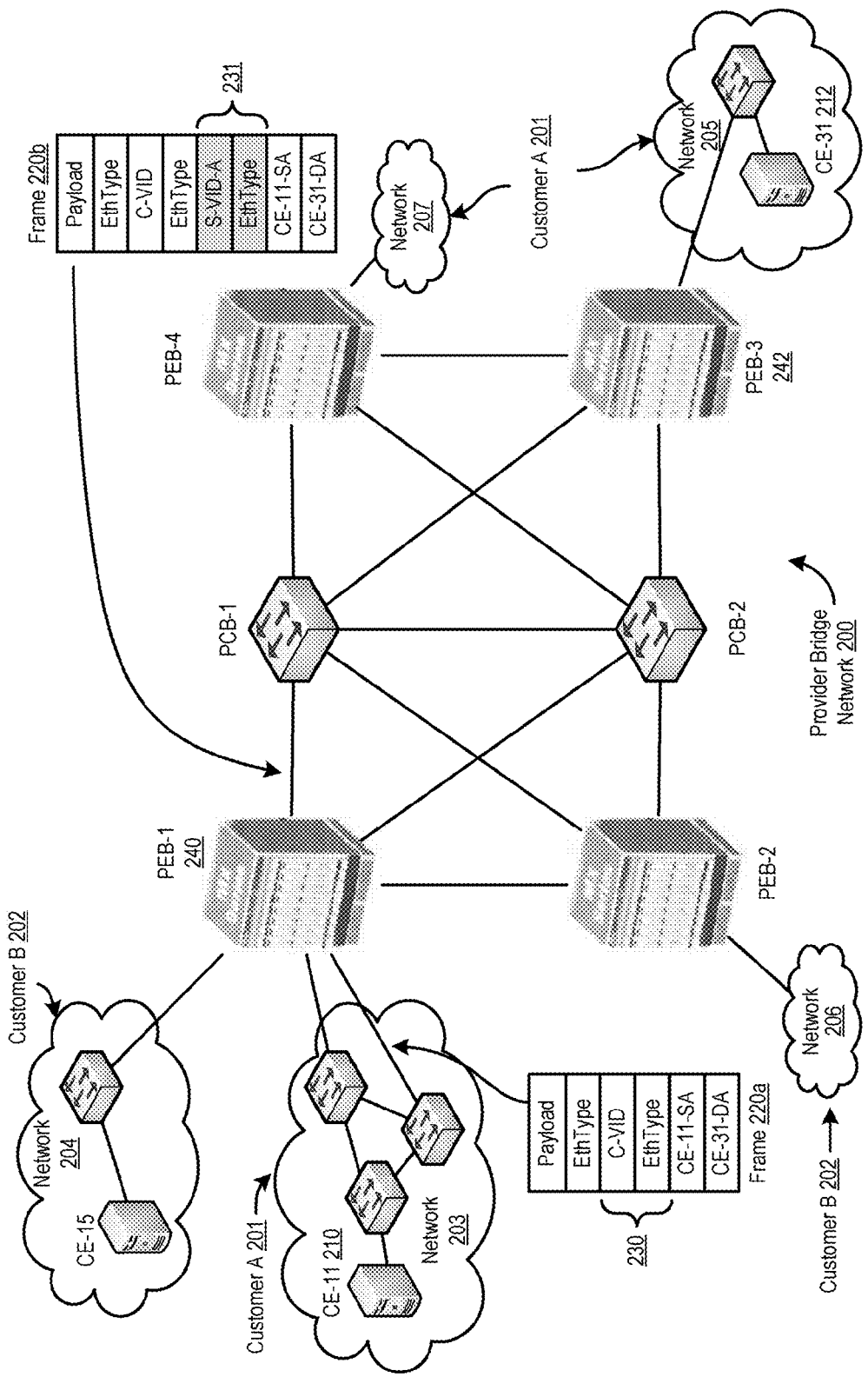
FIG. 2 sets forth a network diagram that illustrates an exemplary provider bridge network interconnecting exemplary customer networks.
Figure 3:
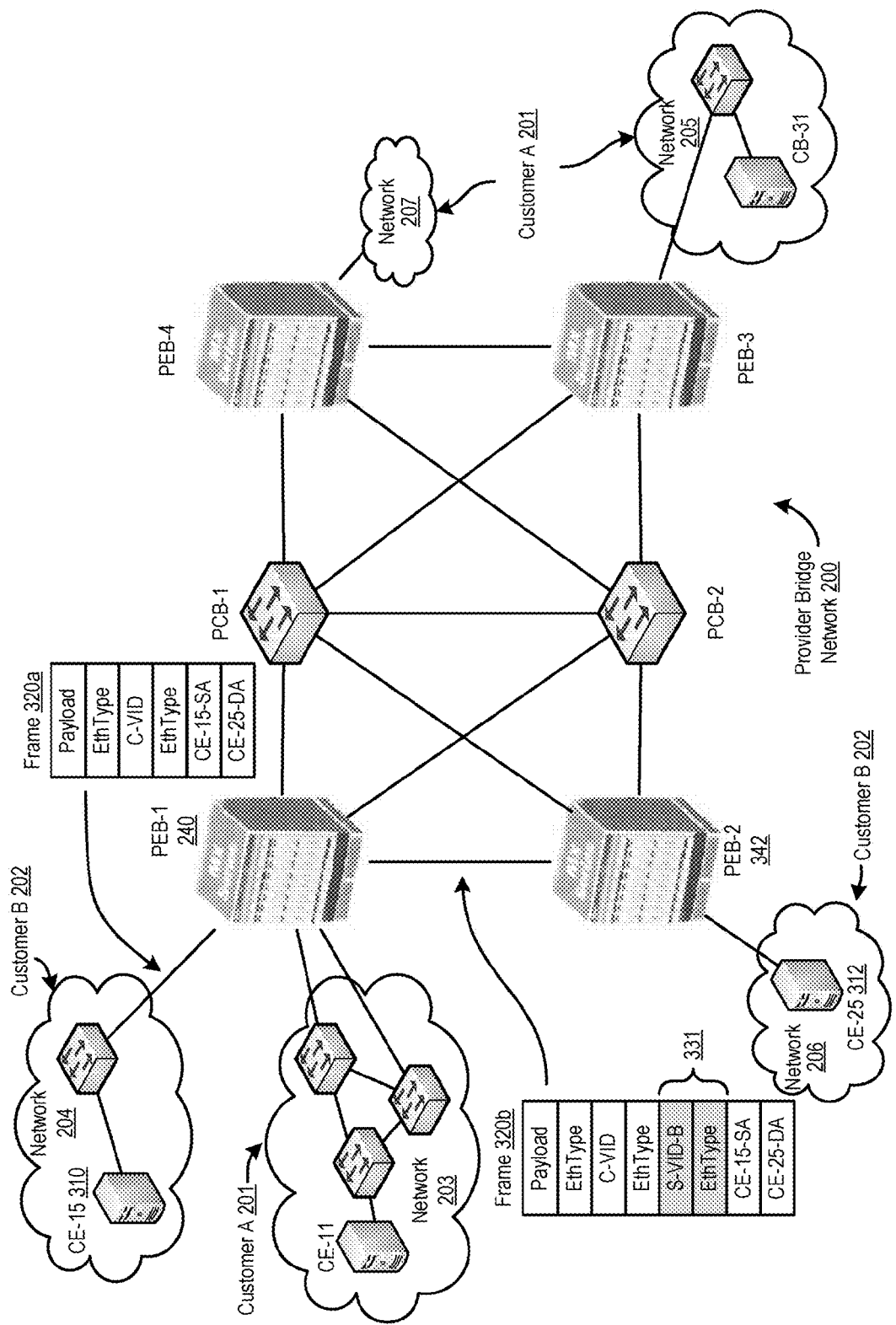
FIG. 3 sets forth a network diagram that illustrates an exemplary provider bridge network interconnecting exemplary customer networks.
Figure 4:
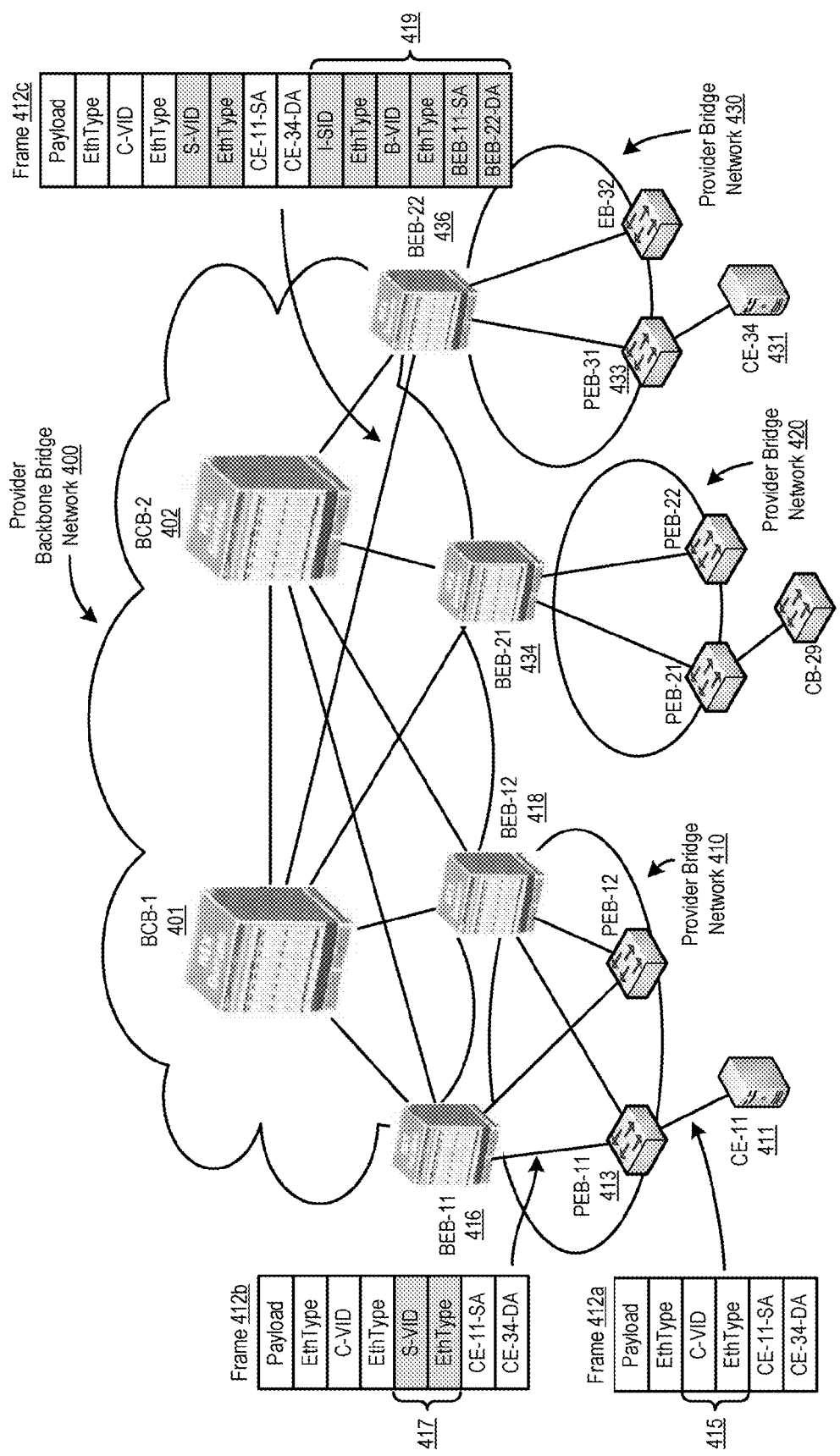
FIG. 4 sets forth a network diagram that illustrates an exemplary provider backbone bridge network interconnecting exemplary provider bridge networks.
Figure 5:
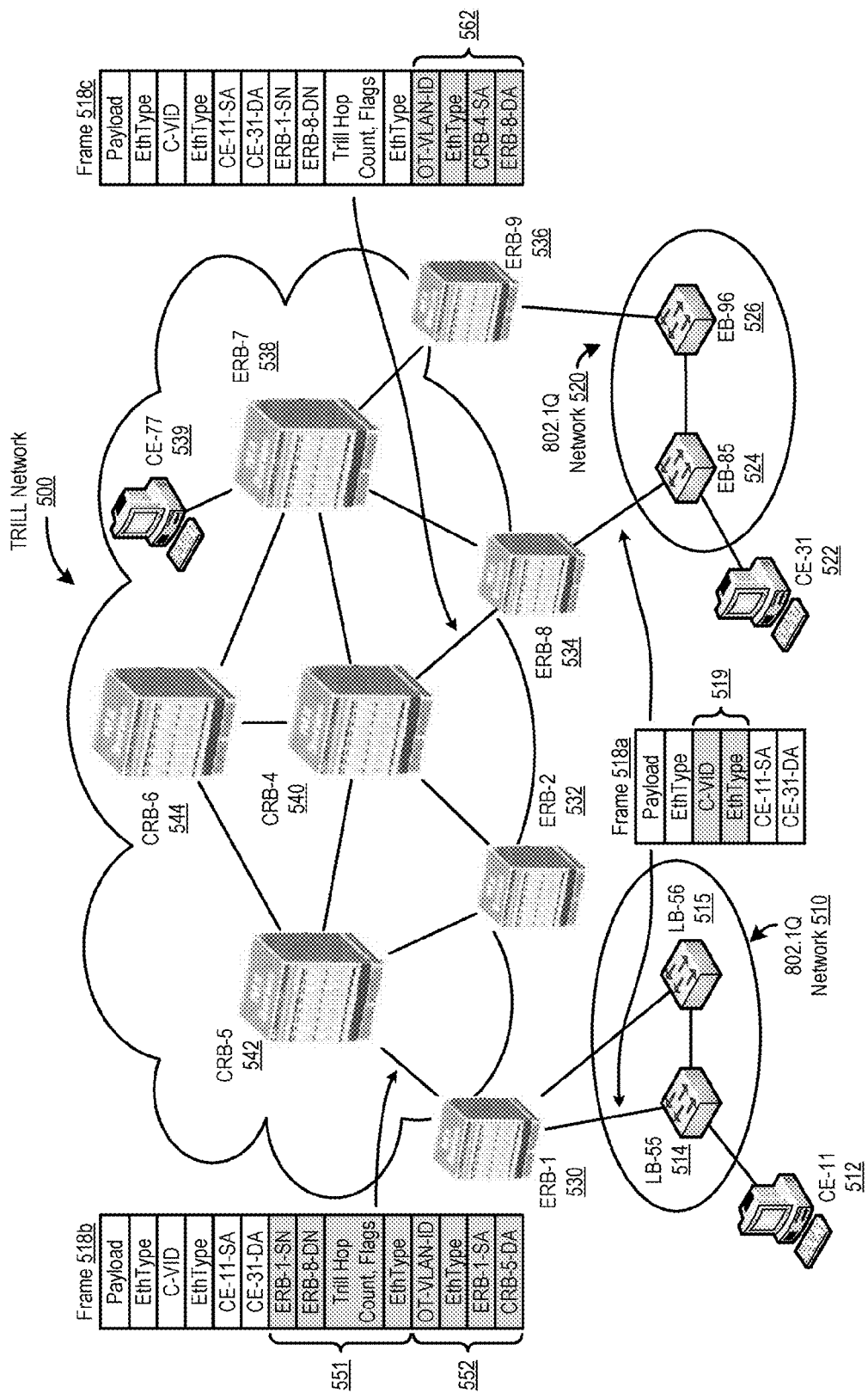
FIG. 5 sets forth a network diagram that illustrates an exemplary TRILL network.
Figure 6:
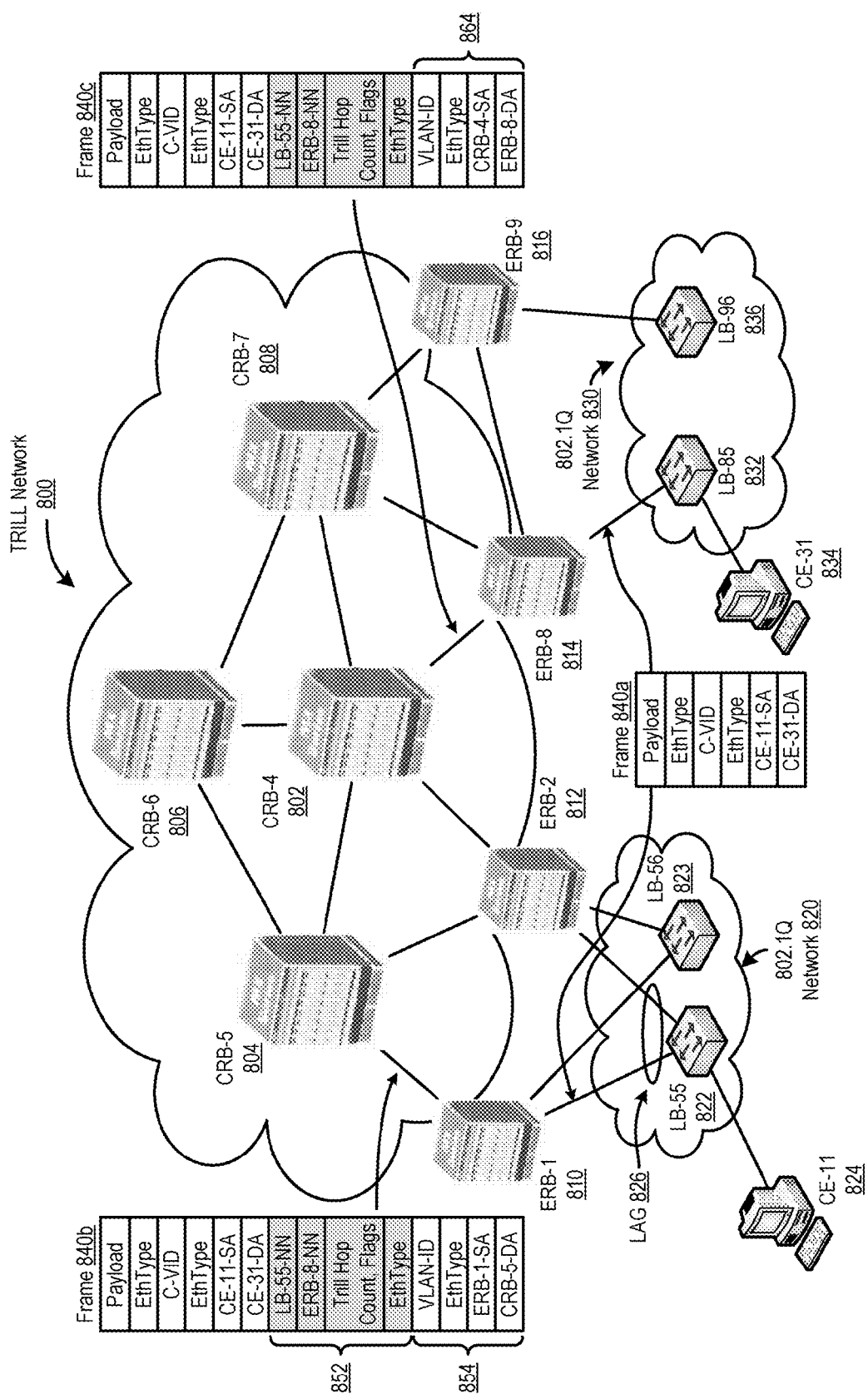
FIG. 6 sets forth a network diagram that illustrates a TRILL network having bridges that support routing frames in a shortest path computer network for a multi-homed legacy bridge node according to embodiments of the present invention.

The Figures provided with this application are used to describe routing frames in a shortest path computer network for a multi-homed legacy bridge node according to embodiments of the present invention, beginning with FIG. 6. A shortest path computer network is a network of bridges and other communications hardware that operate to communicate frames along the shortest path from an ingress bridge to an egress bridge. An ingress bridge is the bridge through which a frame enters a network, and an egress bridge is a bridge through which a frame is transmitted outside the network. The ingress bridges and egress bridges are collectively referred to as edge bridges. The network may implement shortest path communications according to the TRILL protocol, the SPPBB protocol, or any other protocol as will occur to those of skill in the art.

As previously mentioned, shortest path networks typically use MAC-in-MAC encapsulation and require the use of bridges that support such MAC-in-MAC encapsulation. Legacy bridges, however, do not support MAC-in-MAC encapsulation and thus cannot form frames for use in shortest path networks. Such legacy bridges are relegated to positions in the overall system topology outside of the shortest path network. To represent these legacy bridges in the shortest path network, an edge bridge of the network operates as a proxy-node on behalf of one or more legacy bridges. In the absence of embodiments of the present invention, a legacy bridge which is multi-homed by active-active links to multiple router bridges, would only have a single path to and from the shortest path bridging network. If a legacy bridge is only connected to one edge bridge, then the edge bridge which operates as the appointed-forwarder becomes a single point of failure and may be a bottleneck for network traffic between the legacy bridges and the shortest path network.

To overcome these limitations in accordance with embodiments of the present invention, a legacy bridge is multi-homed to two or more edge bridges of a shortest path network while only one of the edge bridges operates as the proxy-node for the legacy bridge. For further explanation, FIG. 6 sets forth a network diagram that illustrates a TRILL network having edge bridges that support routing frames in a shortest path computer network for a multi-homed legacy bridge node according to embodiments of the present invention. The shortest path network is implemented in FIG. 6 as TRILL network 800. TRILL network 800 of FIG. 6 includes four core router-bridges (CRB)—that is, CRB-4 802, CRB-5 804, CRB-6 806, and CRB-7 808-and four edge router-bridges (ERB)—that is, ERB-1 810, ERB-2 812, ERB-8 814, and ERB-9 816. In the example of FIG. 6, the TRILL network 800 interconnects customer equipment (CE)-11 824 and CE-31 834. CE-11 824 connects to the TRILL network 800 through 802.1Q network 820, while CE-31 834 connects to the TRILL network 800 through 802.1Q network 830. The 802.1Q network 830 includes two legacy bridges 832 and 836. The 802.1Q network 820 includes two legacy bridges 822 and 823.

In the example of FIG. 6, legacy bridge (LB)-55 822 is multi-homed to ERB-1 810 and ERB-2 812 through link aggregation group (LAG) 826. Multi-homing refers to a network configuration in which a node physically connects to multiple nodes using separate physical network links that are aggregate into a single logical connection. The logical connection in the example of FIG. 6 is implemented using LAG 826. A link aggregation group is a collection of physical network links and interfaces that operate together to form a single, logical data communications connection. Because a LAG consists of more than one physical link, a LAG typically provides greater communications bandwidth and increased redundancy for higher availability than a logical data communications connection implemented with a single physical link. In FIG. 6, LB-56 823 is also multi-homed to ERB-1 810 and ERB-2 812.

Because legacy bridge 822 of FIG. 6 is multi-homed to both ERB-1 810 and ERB-2 812, either ERB-1 810 and ERB-2 812 may process frames for legacy bridge 822. Frames typically come in two varieties: unicast frames and multicast frames. A unicast frame is a frame that is sent from a source node to a single destination node, typically along a single path through the network. This is in contrast to a multicast frame that is sent from a source node to multiple destination nodes along multiple network paths. According to embodiments of the present invention, both ERB-1 810 and ERB-2 812 may process unicast frames for legacy bridge 822. Whether ERB-1 810 or ERB-2 812 processes the unicast frame typically depends on which of these edge bridges is along the shortest path between the legacy bridge and the node originating or receiving the unicast frame or other factors as will occur to those of skill in the art. Both ERB-1 810 and ERB-2 812 may process unicast frames for legacy bridge 822. Also, both ERB-1 810 and ERB-2 812 may receive multicast frames from legacy bridge 822, but only the edge bridge designated as the proxy-node typically sends multicast frames from the TRILL network 800 to legacy bridge 822. In FIG. 6, ERB-1 810 is designated as the proxy-node. If both ERB-1 810 and ERB-2 812 were to send multicast frames to legacy bridge 822, then legacy bridge 822 would receive duplicate multicast frames. By providing that only the proxy-node sends multicast frames from the TRILL network 800 to legacy bridge 822, legacy bridge 822 only receives one copy of each multicast frame.

As the proxy-node for legacy bridge 822, edge bridge 810 identifies a legacy bridge nickname (LB-55-NN) for the legacy bridge 822. The legacy bridge nickname is a unique identifier in the namespace of a shortest path network and is used to identify a legacy bridge within the shortest path network. In the example of FIG. 6, the legacy bridge nickname is implemented as a TRILL nickname assigned using a dynamic nickname acquisition protocol or other protocols as will occur to those of skill in the art. Bridges in the TRILL network 800 use the legacy bridge nickname to identify the legacy bridge 822 as the originator or destination node for network frames. Readers will note, however, that implementing the legacy bridge nickname as a TRILL nickname is for explanation only and not for limitation. In shortest path networks that do not conform to the TRILL protocol, other implementations of bridge nicknames as will occur to those skilled in the art may also be useful according to embodiments of the present invention. Besides allocating a nickname for the legacy-bridge 822, proxy-node 810 would also generate a link state packet ("LSP") on behalf of legacy-bridge 822, which would:

List ERB-1 and ERB-2 as IS-IS neighbors of LB-55;

Contain the list of VLANs for which LB-55 is the appointed-forwarder; and

Set the IS-IS Overload-bit so that LB-55 is not used as a transit node by any of the router bridges.

FIG. 6 illustrates frame 840 in various stages as the frame 840 traverses the networks of FIG. 6. In FIG. 6, the network administrator managing CE-11 824 and CE-31 834 has grouped CE-11 824 and CE-31 834 into a customer VLAN for data communications. Accordingly, frame 840 of FIG. 6 includes a customer VLAN identifier (C-VID) identifying the particular customer VLAN to which the CE-11 824 and CE-31 834 are assigned and includes a header type (EthType) specifying that the frame is an IEEE 802.1Q compliant frame. The frame 840a also includes a source MAC address (CE-11-SA) designating CE-11 824 as the originator of the frame 840a and a destination MAC address (CE-31-DA) designating CE-31 834 as the destination node to which the frame 840 is transmitted.

In the example of FIG. 6, ERB-1 810 receives the frame 840a from legacy bridge 822, which in turn received frame 840 from CE-11 824. ERB-1 810 then identifies the destination address (CE-31-DA) for the destination node, CE-31 834, of the frame 840. Using the destination address (CE-31-DA), ERB-1 810 determines an egress bridge nickname for the edge bridge through which the destination node CE-31 834 connects to the network 800. In the example of FIG. 6, each bridge in the network 800 maintains tables that map customer equipment to particular edge bridges and legacy bridges represented in the network 800. These tables associate customer equipment MAC addresses with bridge nicknames. In the example of FIG. 6, a table stored by the edge bridge 810 associates the MAC address for customer equipment CE-31 834 with the egress bridge nickname (ERB-8-NN). Using such tables, ERB-1 810 determines that ERB-8 814 is the egress bridge for CE-31 834.

ERB-1 810 of FIG. 6 then adds the previously identified legacy bridge nickname (LB-55-NN) for legacy bridge 822 and the egress bridge nickname (ERB-8-NN) for ERB-8 814 to frame 840b. In the example of FIG. 6, the legacy bridge nickname (LB-55-NN) and the egress bridge nickname (ERB-8-NN) are part of a standard TRILL header 852 that is used according to the TRILL protocol to route the frame 840 through the TRILL network 800. In the example of FIG. 6, the legacy bridge nickname and the egress bridge nicknames conform to the TRILL protocol and are assigned to the bridges using a predetermined protocol such as, for example, a dynamic nickname acquisition protocol described in the "Rbridges: Base Protocol Specification" promulgated by the TRILL Working Group, which is affiliated with the Internet Engineering Task Force. Further details of the TRILL protocol are described in Request for Comment (RFC) 6325, version 13, "Rbridges: Base Protocol Specification," Internet Engineering Task Force, Jun. 26, 2009. Using a TRILL header, however, is for explanation only and not for limitation. Other shortest path routing protocol headers as will occur to those skilled in the art may also be useful.

Upon adding the TRILL header 852 to the frame 840b, ERB-1 810 then routes the frame 840 to the egress bridge node in dependence upon the legacy bridge nickname and the egress bridge nickname. Specifically in FIG. 6, ERB-1 810 identifies a MAC address for a next bridge in the network 800 that is on a path from ERB-1 810 to the ERB-8 814 based on the egress bridge nickname and adds the MAC address (CRB-5-DA) for the next bridge node to the frame 840b in a second Ethernet MAC header 854. At this point the frame 840 is a MAC-in-MAC encapsulated frame 840. As the frame traverses from hop to hop through the TRILL network 800, each bridge along the shortest path from the edge bridge 810 operating as the proxy-node for legacy bridge 822 to the egress edge bridge 814 updates the second (encapsulating) Ethernet MAC header 854 to reflect the MAC address of the bridge for the next hop.

When the frame 840c arrives at the egress bridge ERB-8 814 in the example of FIG. 6, CRB-8 814 determines that the frame 840 leaves the TRILL network 800 on the next hop along the path to CE-31 834. CRB-8 814 then removes the TRILL header 864 from the frame and forwards frame 840 for delivery to CE-31 834 through the 802.1Q network 830.

Figure 7:
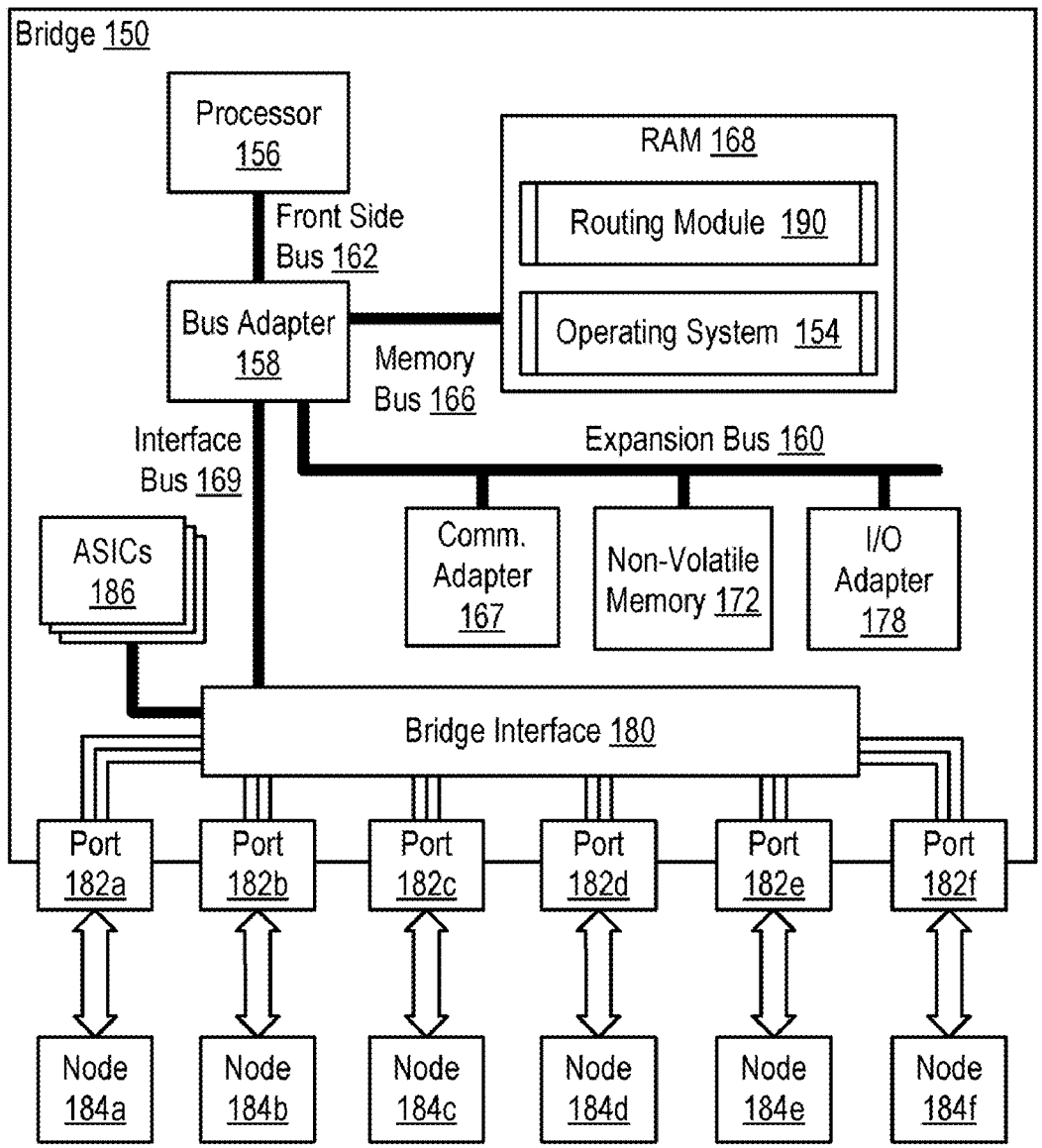
FIG. 7 sets forth a block diagram of automated computing machinery comprising an exemplary bridge useful in routing frames in a shortest path computer network for a multi-homed legacy bridge node according to embodiments of the present invention.

Routing frames in a shortest path computer network for a multi-homed legacy bridge node according to embodiments of the present invention is implemented generally with computers, that is, automated computing machinery. For further explanation, therefore, FIG. 7 sets forth a block diagram of automated computing machinery comprising an exemplary bridge 150 useful in routing frames in a shortest path computer network for a multi-homed legacy bridge node according to embodiments of the present invention. The bridge 150 of FIG. 7 is one of a plurality of bridge nodes included in the computer network. At least two of the bridge nodes in the network operate as edge bridge nodes through which the frames ingress and egress the computer network.

In the example of FIG. 7, the exemplary bridge 150 includes at least one processor 156 or 'CPU' as well as random access memory 168 (RAM) which is connected through a high speed memory bus 166 and bus adapter 158 to the processor 156 and to other components of the exemplary bridge 150.

Stored in RAM 168 of FIG. 7 is a routing module 190. The routing module 190 of FIG. 7 is computer program instructions for routing frames in a shortest path computer network for a multi-homed legacy bridge node according to embodiments of the present invention. The routing module 190 of FIG. 7 operates generally for routing frames in a shortest path computer network for an active-active multi-homed legacy bridge node according to embodiments of the present invention depending on the operational mode of the bridge 150 in the network topology. For example, the bridge 150 may operate in the network topology as an ingress bridge or an egress bridge. An ingress bridge is a bridge through which a frame enters the computer network from another network. An egress bridge is a bridge through which the frame is transmitted out of the network into another network. These operational modes are distinct from when a bridge operates as a core bridge, which is a bridge in the computer network that routes frames between edge bridges—that is, between ingress bridges and egress bridges.

When the bridge 150 operates as an ingress bridge for the network, the routing module 190 of FIG. 7 operates generally for routing frames in a shortest path computer network for a multi-homed legacy bridge node according to embodiments of the present invention as follows: The bridge node 150 identifies a legacy bridge nickname for a multi-homed legacy bridge node. The legacy bridge node connects to the computer network through the edge bridge node 150 and a second edge bridge in the network node using link aggregation in which a link to each edge bridge is active. The bridge node 150 receives a frame from the legacy bridge node. The frame specifies a source node address for a source node originating the frame and a destination node address for a destination node to which the frame is transmitted. The source node connects to the network through the legacy bridge and the bridge 150 or the second edge bridge node. The destination node connects to the network through a third edge bridge node. The bridge node 150 determines, in dependence upon the destination node address, an egress bridge nickname for the third bridge node through which the destination node connects to the network. The bridge node 150 adds the legacy bridge nickname and the egress bridge nickname to the frame. The bridge node 150 then routes to the third bridge node through which the destination node connects to the network, the frame in dependence upon the egress bridge nickname.

When the bridge 150 operates as an egress bridge for the network, the routing module 190 of FIG. 7 operates generally for routing frames in a shortest path computer network for a multi-homed legacy bridge node according to embodiments of the present invention as follows: The bridge node 150 identifies a legacy bridge nickname for a legacy bridge node. The legacy bridge node connects to the computer network through the first edge bridge node and a second edge bridge node using link aggregation in which at least one link to each edge bridge is active. The bridge node 150 receives a frame for routing to the legacy bridge node. The frame specifies a source node address for a source node originating the frame and a destination node address for a destination node to which the frame is transmitted. The source node connects to the network through a third edge bridge node. The destination node connects to the network through the legacy bridge and the first or second edge bridge node. The frame also includes the legacy bridge nickname for the legacy bridge node and an ingress bridge nickname for the third edge bridge node. The bridge node 150 removes the legacy bridge nickname and the ingress bridge nickname from the frame. The bridge node 150 routes the frame to the legacy bridge node for delivery to the destination node.

Also stored in RAM 168 is an operating system 154. Operating systems useful in bridges according to embodiments of the present invention may include Juniper Networks' JUNOS® and JUNOSe®, Cisco's IOS®, or Extreme Networks' ExtremeXOS®. Other operating systems that may be useful in bridges according to embodiments of the present invention may include lightweight versions of UNIX™, Linux™, Microsoft XP™, and others as will occur to those skilled in the art. Operating system 154 and routing module 190 in the example of FIG. 7 are shown in RAM 168, but many components of such software typically are stored in non-volatile memory 172 also, for example, Electrically Erasable Programmable Read-Only Memory (EEPROM) or in memory of the application-specific integrated circuits (ASICs) 186.

The bridge 150 of FIG. 7 includes a bridge interface 180 connected to the other component of the bridge 150 through the bus adapter 158. The bridge interface 180 provides ports 182 through which nodes 184 connected to the bridge 150. The nodes 184 may be implemented as servers, workstations, network devices, or any other computing device as will occur to those of skill in the art. The bridge interface 180 of FIG. 7 includes switching circuitry controlled by the processor 156 or ASICs 186. The switching circuitry of the bridge interface 180 provides high-speed switching services to rapidly receive frames on one port and forward those frames on to their ultimate destination through another port. The switching circuitry may also provided limited processing capabilities off-loaded from the ASICs 186 or the processor 156.

In the example of FIG. 7, the ASICs 186 connected to the bridge interface 180 provide certain frame processing services in an effort to offload processing from the main processor 156. For example, the ASICs 186 may be used to provide filtering, replication, forwarding, encapsulation, or de-encapsulation services. Even still, the ASICs 186 may contain and execute the routing module 190 as described above.

The exemplary bridge 150 of FIG. 7 includes a bus adapter 158, a computer hardware component that contains drive electronics for the high speed buses, the front side bus 162 and the memory bus 166, as well as drive electronics for the interface bus 169 and the slower expansion bus 160. Through the expansion bus 160 of FIG. 7, the communications adapter 167, non-volatile memory 172, and I/O adapter 178 are connected to the other components of the exemplary bridge 150.

The exemplary bridge 150 of FIG. 7 includes one or more input/output ('I/O') adapters 178. I/O adapters 178 provide components that allow the processor 156 to interface with various I/O components of the bridge. Exemplary I/O components may include, for example, light-emitting diodes (LEDs), liquid-crystal displays (LCDs), physical switches and buttons, or other interface components as will occur to those of skill in the art.

The exemplary bridge 150 of FIG. 7 also includes a communications adapter 167 for data communications with other computing devices out of band from the network communications through ports 182. The communications adapter 167 may provide the processor 156 with a interface according to the Universal Serial Bus (USB) specification, Small Computer System Interface (SCSI) specification, RS-232 specification, Inter-Integrated Circuit ($I^2C$) bus protocol, a System Management Bus (SMBus) protocol, an Intelligent Platform Management Bus (IPMB) protocol, or the like.

Readers will note that the exemplary implementation of the bridge 150 of FIG. 7 is for explanation only and not for limitation. Other computing architectures as will occur to those of skill in the art may also be useful for routing frames in a provider network using bridge identifiers according to embodiments of the present invention. For example, the bridge may be implemented using a general-purpose computer or a specialized computing device dedicated for network frame processing, or other hybrid architectures.

Figure 8:
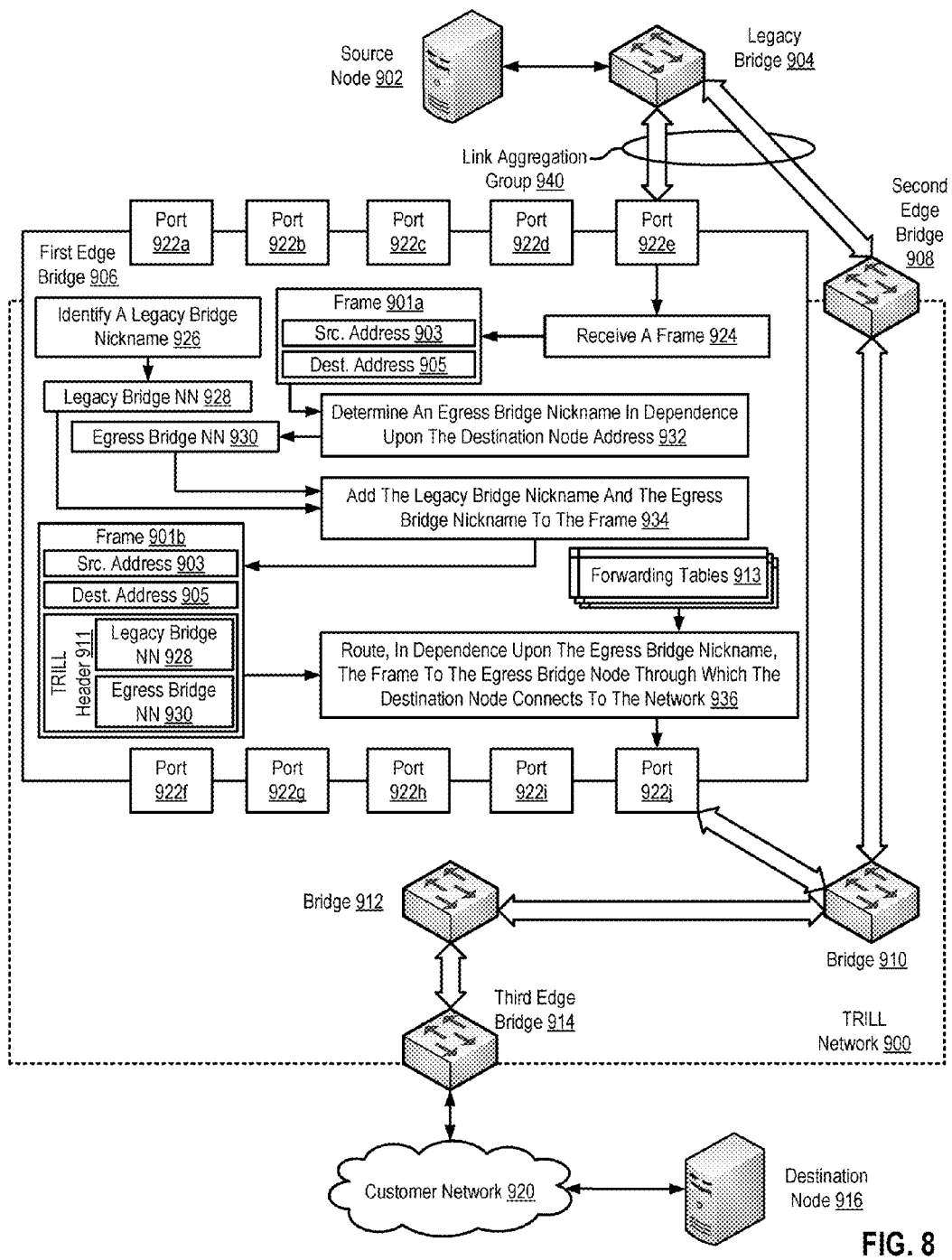
FIG. 8 sets forth a diagram illustrating an exemplary method of routing frames in a shortest path computer network for a multi-homed legacy bridge node according to embodiments of the present invention.
Figure 9:
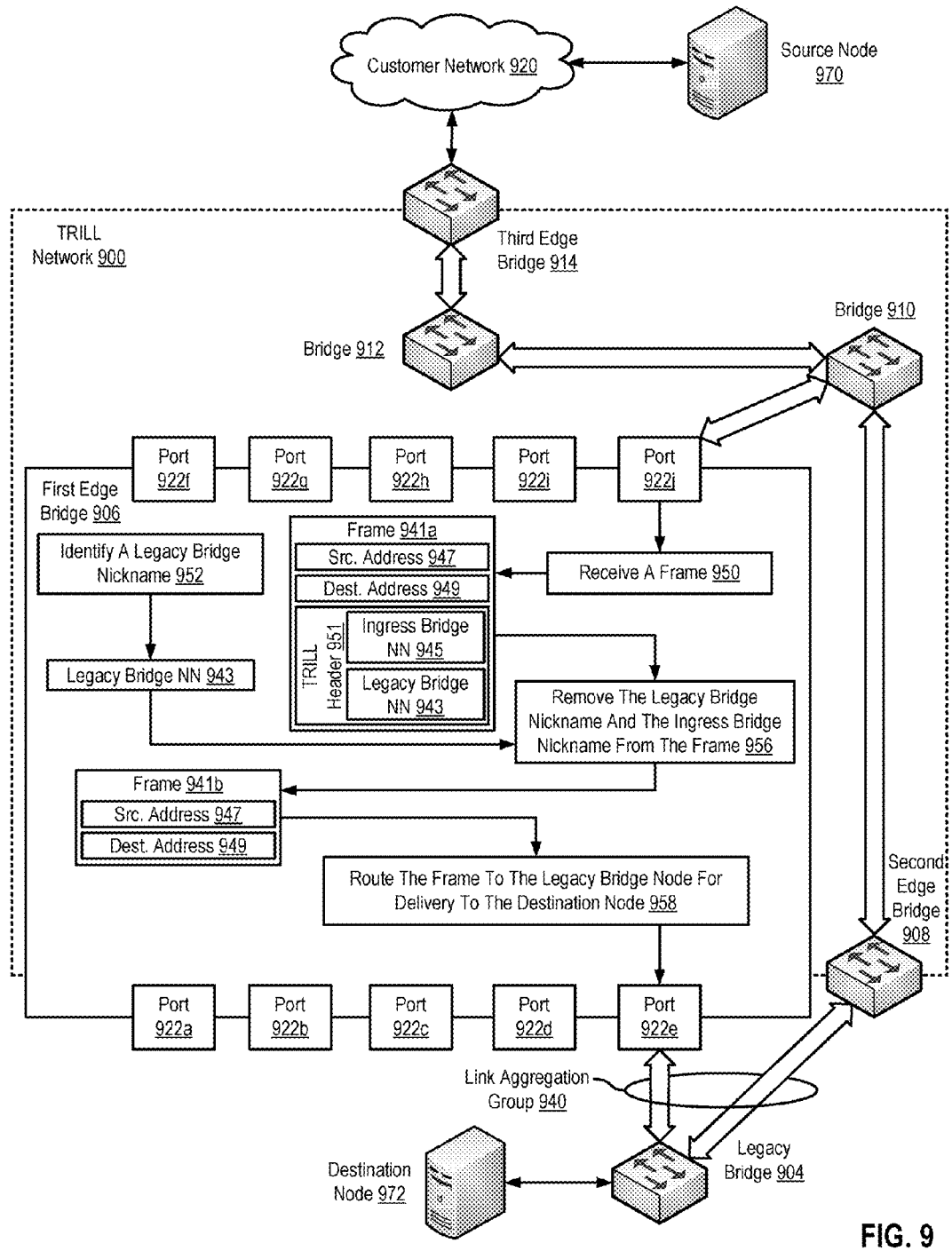
FIG. 9 sets forth a diagram illustrating a further exemplary method of routing frames in a shortest path computer network for a multi-homed legacy bridge node according to embodiments of the present invention.

FIGS. 8-9 provide further explanation of various embodiments of the present invention as a bridge operates as an ingress bridge node and an egress bridge node according to embodiments of the present invention for routing frames in a shortest path computer network for a multi-homed legacy bridge node. FIG. 8 describes the methods performed by an ingress bridge node in the computer network. FIG. 9 describes the methods performed by an egress bridge node in the computer network.

As mentioned above, FIG. 8 sets forth a flow chart illustrating an exemplary method of routing frames in a shortest path computer network for an active-active multi-homed legacy bridge node according to embodiments of the present invention. In the example of FIG. 8, the shortest path network is implemented as a TRILL network 900. The network 900 includes a plurality of bridge nodes 906, 908, 910, 912, and 914. Bridge nodes 906, 908, 914 operates as edge bridge nodes through which the frames ingress and egress the network 900.

The example of FIG. 8 also includes a legacy bridge 904 that connects a source node 902 to the network 900. The legacy bridge 904 connects to the network 900 through the first edge bridge 906 and the second edge bridge 908 using link aggregation in which at least one link to each edge bridge 906,908 is active. The links aggregated to connect the legacy bridge 904 to the first edge bridge 906 and the second edge bridge 908 form link aggregation group 940. In the example of FIG. 8, the legacy bridge node 904 does not support MAC-in-MAC encapsulation at both the hardware and software level, and thus is unable to support the TRILL protocol or other shortest path protocols that utilize MAC-in-MAC encapsulation. Thus, the first edge bridge node 906 operates as a proxy-node for the legacy bridge 904 in the network 900.

Besides allocating a nickname for the legacy bridge 904, proxy-node 906 would also generate a LSP on behalf of legacy bridge 904, which would:

List router bridge 906 and router bridge 908 as IS-IS neighbors of legacy bridge 904;

Contain the list of VLANs for which legacy bridge 904 is the appointed-forwarder; and Set the IS-IS overload-bit so that legacy bridge 904 is not used as a transit node by any of the router bridges.

The edge bridge node 906 of FIG. 8 includes ten ports 922a-j through which other nodes may connect to the bridge node 906. In the example of FIG. 8, the links in the link aggregation group 940 connecting the legacy bridge 904 to the edge bridge node 906 are connected to port 922e. Core bridge node 910 connects to the edge bridge node 906 through port 922j.

The method of FIG. 8 includes identifying 926, by the first edge bridge node 906, a legacy bridge nickname 928 for a legacy bridge node 904. The legacy bridge nickname is a unique identifier in the namespace of a shortest path network. Although the legacy bridge 904 by itself does not participate in shortest-path bridging or TRILL network 900, the bridges in the network 900 use the legacy bridge nickname 928 to identify legacy bridge 904 within the shortest path network. In the example of FIG. 8, the legacy bridge nickname 928 is implemented as a TRILL nickname assigned using a dynamic nickname acquisition control protocol or other protocols as will occur to those of skill in the art.

The method of FIG. 8 includes receiving 924, by the first edge bridge node 906, a frame 901 from the legacy bridge node 904. The frame 901 specifies a source node address 903 for a source node 902 originating the frame 901 and a destination node address 905 for a destination node 916 to which the frame 901 is transmitted. The destination node 916 connects to the network 900 through customer network 920 and the third edge bridge node 914. The source and destination node addresses 903, 905 may be implemented as MAC addresses. The first edge bridge node 906 may receive 924 a frame 901a from the legacy bridge 904 according to the method of FIG. 8 by retrieving the frame 901a from a reception stack for port 922e and advancing the stack pointer for the reception stack. The reception stack may be implemented as a buffer into which frames received from a port are placed until those frames are processed by the bridge 906.

The method of FIG. 8 includes determining 932, by the first edge bridge node 906 in dependence upon the destination node address 905, an egress bridge nickname 930 for the third edge bridge node 914 through which the destination node 916 connects to the network 900. The first edge bridge node 906 may determine 932 an egress bridge nickname 930 according to the method of FIG. 8 using a lookup table (not shown) that associates bridge nicknames with network addresses. The lookup table may be populated as the edge bridges 906, 908, 914 of the network 900 learn and share the network addresses of the devices connected to bridges and networks outside of the shortest path network 900. Using such a lookup table, the first edge bridge node 906 may identify the nickname associated in the lookup table with the destination node address 905 specified in the frame 901a.

The method of FIG. 8 also includes adding 934, by the first edge bridge node 906, the legacy bridge nickname 928 and the egress bridge nickname 930 to the frame, resulting in frame 901b illustrated in FIG. 8. The first edge bridge node 906 may add 934 the legacy bridge nickname 928 and the egress bridge nickname 930 to the frame 901b by adding a vender header to the frame 901b that includes the legacy bridge nickname 928 and the egress bridge nickname 930. In FIG. 8, the vender header is implemented as TRILL header 911, which conforms to the TRILL protocol.

The method of FIG. 8 also includes routing 936, by the first edge bridge node 906 to the third edge bridge node 914 through which the destination node 916 connects to the network 900, the frame 901 in dependence upon the egress bridge nickname 930. The first edge bridge node 906 may route 936 the frame 901 to the third edge bridge node 914 according to the method of FIG. 8 by identifying, in dependence upon the egress bridge nickname 930, a MAC address for a next bridge 910 in the network 900 that is on a path from the first edge bridge node 906 to the third edge bridge node 914. The first edge bridge node 906 may identify the next bridge 910 in the network 900 and its MAC address using forwarding tables 913, which may be implemented in any manner as will occur to those of skill in the art and associate MAC addresses for adjacent bridge nodes with the nicknames of other bridges in the network 800. The nickname-MAC address pairs are associated in the forwarding tables 913 in such a manner that the adjacent node specified by the MAC address is the next node along the shortest path to the edge bridge node specified by the nickname. The first edge bridge node 906 may further route 936 the frame 901 according to the method of FIG. 8 by adding the MAC address for the next bridge node 910 to the frame 901 and routing the frame 901 to the next bridge node 910 using the MAC address.

Routing the frame 901 to the next bridge node 910 using the MAC address may be carried out according to the method of FIG. 8 by injecting the frame 901 in the transmission stack for the port 922j associated with the next bridge node 910 in a port mapping table (not shown). Such port mapping tables associate a port identifier with network addresses of nodes connected to the bridge 906 via a network link using a particular port. Once the frame 901 is placed in the transmission stack for a port 922, the bridge interface, such the bridge interface described with reference to FIG. 7, sends the frame 901 out from the appropriate port 922 to the next bridge—that is, bridge 910.

Upon receiving the frame 901, the core bridge 910 continues to route the frame 901 through the network 900 according to the TRILL protocol until the frame 901 reaches the third edge bridge 914 operating as an egress bridge. The third edge bridge then removes the TRILL header 911 from the frame 901 and forwards the frame 901 along to customer network 920 for delivery to the destination node 916.

In FIG. 8, the first edge bridge 906 operates as an ingress bridge, whereby the first edge bridge processes a frame as the frame enters the network 900. Turning now to FIG. 9, the first edge bridge 906 operates as an egress bridge, whereby the first edge bridge processes a frame as the frame is transmitted outside the network 900. FIG. 9 sets forth a flow chart illustrating a further exemplary method of routing frames in a shortest path computer network for a multi-homed legacy bridge node according to embodiments of the present invention. The network topology of FIG. 9 is similar to the topology in FIG. 8. In the example of FIG. 9, the shortest path network is implemented as a TRILL network 900. The network 900 includes a plurality of bridge nodes 906, 908, 910, 912, and 914. Bridge nodes 906, 908, 914 operates as edge bridge nodes through which the frames ingress and egress the network 900.

The example of FIG. 9 also includes a legacy bridge 904 that connects a destination node 972 to the network 900. The legacy bridge 904 connects to the network 900 through the first edge bridge 906 and the second edge bridge 908 using link aggregation in which at least one link to each edge bridge 906,908 is active. The links aggregated to connect the legacy bridge 904 to the first edge bridge 906 and the second edge bridge 908 form link aggregation group 940. In the example of FIG. 9, the legacy bridge node 904 does not support MAC-in-MAC encapsulation at both the hardware and software level, and thus is unable to support the TRILL protocol or other shortest path protocols that utilize MAC-in-MAC encapsulation. Thus, the first edge bridge node 906 operates as a proxy-node for legacy bridge 904 in the network 900.

The edge bridge node 906 of FIG. 9 includes ten ports 922a-j through which other nodes may connect to the bridge node 906. In the example of FIG. 9, the links in the link aggregation group 940 connecting the legacy bridge 904 to the edge bridge node 906 are connected to port 922e. Core bridge node 910 connects to the edge bridge node 906 through port 922j.

In the example of FIG. 9, the third edge bridge 914 operates as an ingress bridge node that receives a frame 941 originating from a source node 970. The third edge bridge 914 receives the frame 941 through customer network 920 to which the source node 970 is connected. As the third edge bridge 914 processes the frame 941, the third edge bridge 914 adds a TRILL header 951 to the frame so that the frame may be routed through the TRILL network 900 according to the TRILL protocol. The third edge bridge 916 will encode its own nickname 945 within the ingress bridge nickname field of the TRILL header. In FIG. 9, the third edge bridge 914 may obtain the legacy bridge nickname 943 much in the same way that the first edge bridge 906 obtains the egress bridge nickname as described with reference to FIG. 8.

The legacy bridge nickname 943 provided to the bridges in the network is provided by the first edge bridge 906, which operates as a proxy-node for the legacy bridge 904. The method of FIG. 9 includes identifying 952, by the first edge bridge node 906, a legacy bridge nickname 943 for a legacy bridge node 904. As previously described, the legacy bridge nickname is a unique identifier in the namespace of a shortest path network. Although the legacy bridge 904 is not included in the network 900, the bridges in the network 900 use the legacy bridge nickname 943 to identify a legacy bridge 904 within the shortest path network. In the example of FIG. 9, the legacy bridge nickname 943 is implemented as a TRILL nickname assigned using a dynamic nickname acquisition control protocol or other protocols as will occur to those of skill in the art.

The method of FIG. 9 includes receiving 950, by the first edge bridge node 906, the frame 941 for routing to the legacy bridge node 904. The frame 941 specifies a source node address 947 for the source node 970 originating the frame 941 and a destination node address 949 for the destination node 972 to which the frame 941 is transmitted. The first edge bridge node 906 may receive 950 the frame 941a according to the method of FIG. 9 by retrieving the frame 941a from a reception stack for port 922j and advancing the stack pointer for the reception stack. The reception stack may be implemented as a buffer into which frames received from a port are placed until those frames are processed by the bridge 906.

Upon receiving frame 941, the first edge bridge 906 determines that the frame 941 should be sent to the legacy bridge 904 on the next hop toward the destination node 972 based on the legacy bridge nickname 943 embedded in the frame 941a. Because the legacy bridge does not support the TRILL protocol or other shortest path bridging protocols utilizing MAC-in-MAC encapsulation, the method of FIG. 9 includes removing 956 the legacy bridge nickname 943 and the ingress bridge nickname 945 from the frame 941a. The first edge bridge 906 may remove 956 the legacy bridge nickname 943 and the ingress bridge nickname 945 from the frame 941a by removing the TRILL header 951, which result in frame 941b. The first edge bridge 906 may obtain supported features of the legacy bridge 904 using any control protocol as will occur to those skilled the art.

The method of FIG. 9 includes routing 958, by the first edge bridge node 906, the frame 941 to the legacy bridge node for delivery to the destination node. The first edge bridge node 906 may route 958 the frame 941 to the legacy bridge node 904 according to the method of FIG. 9 by storing the frame 941 in the transmission stack for the port 922e corresponding the legacy bridge node 904. Once the frame 941 is placed in the transmission stack for a port 922e, the bridge interface, such the bridge interface described with reference to FIG. 7, sends the frame 941 out from port 922e to the legacy bridge node 904 through links in the link aggregation group.

Exemplary embodiments of the present invention are described largely in the context of a fully functional network bridges configured for routing frames in a shortest path computer network for a multi-homed legacy bridge node. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of routing frames in a shortest path computer network for a multi-homed legacy bridge node, the computer network including a plurality of bridge nodes, at least two of the plurality of bridge nodes operating as edge bridge nodes through which the frames ingress and egress the computer network, the method comprising steps of:

identifying, by a first edge bridge node, a legacy bridge nickname for the legacy bridge node, wherein the legacy bridge node is connected to the computer network through the first edge bridge node and a second edge bridge node using link aggregation in which at least one of a first link to the first edge bridge node and a second link to the second edge bridge node is active;

receiving, by the first edge bridge node, a frame from the legacy bridge node, wherein the frame specifies a source node address for a source node originating the frame and a destination node address for a destination node to which the frame is transmitted, and wherein the source node is connected to the network through the legacy bridge node and one of the first or the second edge bridge node, and the destination node is connected to the network through a third edge bridge node;

determining, by the first edge bridge node, an egress bridge nickname for the third edge bridge node based on the destination node address;

adding, by the first edge bridge node, the legacy bridge nickname and the egress bridge nickname to the frame; and routing, by the first edge bridge node, the frame to the third edge bridge node based on the egress bridge nickname.

2. The method of claim 1 wherein the step of adding the legacy bridge nickname and the egress bridge nickname to the frame further comprises a step of adding a vender header to the frame that includes the legacy bridge nickname and the egress bridge nickname.

3. The method of claim 1 wherein the step of routing the frame further comprises steps of:

identifying, based on the egress bridge nickname, a media access control ('MAC') address for a next bridge node in the network that is on a path from the first edge bridge node to the third edge bridge node;

adding the MAC address for the next bridge node to the frame; and routing the frame to the next bridge node based on the MAC address.

4. The method of claim 1 wherein the computer network and the edge bridge nodes support a Transparent Interconnection of Lots of Links ('TRILL') protocol, the legacy bridge nickname conforms to the TRILL protocol, and the egress bridge nickname conforms to the TRILL protocol, and wherein routing the frame comprises routing the frame through the computer network using the TRILL protocol.

5. The method of claim 1 wherein the legacy bridge node does not support Media Access Control (MAC)-in-MAC encapsulation, and wherein routing the frame comprises routing the frame through the computer network with MAC-in-MAC encapsulation.

6. The method of claim 1 further comprising processing, by the first edge bridge node and the second edge bridge node, unicast frames for the legacy bridge node.

7. The method of claim 1 further comprising transmitting, by only one of the first edge bridge node and the second edge bridge node, multicast frames towards the legacy bridge node.

8. A method of routing frames in a shortest path computer network for a multi-homed legacy bridge node, the computer network including a plurality of bridge nodes, at least two of the plurality of bridge nodes operating as edge bridge nodes through which the frames ingress and egress the computer network, the method comprising steps of:
identifying, by a first edge bridge node, a legacy bridge nickname for the legacy bridge node, wherein the legacy bridge node is connected to the computer network through the first edge bridge node and a second edge bridge node using link aggregation in which at least one of a first link to the first edge bridge node and a second link to the second edge bridge node is active;
receiving, by the first edge bridge node, a frame for routing to the legacy bridge node, wherein the frame specifies a source node address for a source node originating the frame and a destination node address for a destination node to which the frame is transmitted, wherein the source node is connected to the network through a third edge bridge node, and the destination node is connected to the network through the legacy bridge node and one of the first edge bride node or the second edge bridge node, and wherein the frame also includes the legacy bridge nickname for the legacy bridge node and an ingress bridge nickname for the third edge bridge node;
removing, by the first edge bridge node, the legacy bridge nickname and the ingress bridge nickname from the frame; and
routing, by the first edge bridge node, the frame to the legacy bridge node for delivery to the destination node.

9. The method of claim 8 wherein the step of removing the legacy bridge nickname and the ingress bridge nickname from the frame further comprises a step of removing a vender header that includes the legacy bridge nickname and the ingress bridge nickname from the frame.

10. The method of claim 8 wherein the computer network and the edge bridge nodes support a Transparent Interconnection of Lots of Links ('TRILL') protocol, the legacy bridge nickname conforms to the TRILL protocol, and the ingress bridge nickname conforms to the TRILL protocol, further comprising routing the frame through the computer network using the TRILL protocol.

11. The method of claim 8 wherein the legacy bridge node does not support Media Access Control (MAC)-in-MAC encapsulation, further comprising routing the frame through the computer network with MAC-in-MAC encapsulation.

12. An apparatus for routing frames in a shortest path computer network for a multi-homed legacy bridge node, the computer network including a plurality of bridge nodes, at least two of the plurality of bridge nodes operating as edge bridge nodes through which the frames ingress and egress the computer network, the apparatus operating as a first edge bridge node, the apparatus comprising:
a computer memory that stores data; and
a processor configured to:
identify a legacy bridge nickname for the legacy bridge node, wherein the legacy bridge node is connected to the computer network through the first edge bridge node and a second edge bridge node using link aggregation in which at least one of a first link to the first edge bridge node and a second link to the second edge bridge node is active,
receive a frame from the legacy bridge node, wherein the frame specifies a source node address for a source node originating the frame and a destination node address for a destination node to which the frame is transmitted, and wherein the source node is connected to the network through the legacy bridge node and one of the first edge bridge node or the second edge bridge node, and the destination node is connected to the network through a third edge bridge node,
determine an egress bridge nickname for the third edge bridge node based on the destination node address,
add the legacy bridge nickname and the egress bridge nickname to the frame, and
route the frame to the third edge bridge node based on the egress bridge nickname.

13. The apparatus of claim 12 wherein the processor is configured to add a vender header to the frame that includes the legacy bridge nickname and the egress bridge nickname.

14. The apparatus of claim 12 wherein the processor is configured to:
identify, based on the egress bridge nickname, a media access control ('MAC') address for a next bridge node in the network that is on a path from the first edge bridge node to the third edge bridge node;
add the MAC address for the next bridge node to the frame; and
route the frame to the next bridge node based on the MAC address.

15. The apparatus of claim 12 wherein the computer network, the second edge bridge node, and the apparatus operating as the first edge bridge node support a Transparent Interconnection of Lots of Links ('TRILL') protocol, the legacy bridge nickname conforms to the TRILL protocol, and the egress bridge nickname conforms to the TRILL protocol, and wherein the processor is configured to route the frame through the computer network using the TRILL network.

16. The apparatus of claim 12 wherein the legacy bridge node does not support Media Access Control (MAC)-in-MAC encapsulation, and wherein the apparatus operating as the first edge bridge node supports MAC-in-MAC encapsulation, and the processor is configured to route the frame through the computer network using MAC-in-MAC encapsulation.

17. The apparatus of claim 12 wherein the processor is configured to process unicast frames for the legacy bridge node.

18. The apparatus of claim 12 wherein the processor is configured to transmit multicast frames towards the legacy bridge node.

19. An apparatus for routing frames in a shortest path computer network for a multi-homed legacy bridge node, the computer network including a plurality of bridge nodes, at least two of the plurality of bridge nodes operating as edge bridge nodes through which the frames ingress and egress the computer network, the apparatus operating as a first edge bridge node, the apparatus comprising:
a computer memory that stores data; and
a processor configured to:
identify a legacy bridge nickname for the legacy bridge node, wherein the legacy bridge node is connected to the computer network through the first edge bridge node and a second edge bridge node using link aggregation in which at least one of a first link to the first edge bridge node and a second link to the second edge bridge node is active, receive a frame for routing to the legacy bridge node, wherein the frame specifies a source node address for a source node originating the frame and a destination node address for a destination node to which the frame is transmitted, wherein the source node is connected to the network through a third edge bridge node, and the destination node is connected to the network through the legacy bridge node and one of the first edge bridge node or the second edge bridge node, and wherein the frame also including includes the legacy bridge nickname for the legacy bridge node and an ingress bridge nickname for the third edge bridge node, remove the legacy bridge nickname and the ingress bridge nickname from the frame, and route the frame to the legacy bridge node for delivery to the destination node.

20. The apparatus of claim 19 wherein the processor is configured to remove a vender header that includes the legacy bridge nickname and the ingress bridge nickname from the frame.

21. The apparatus of claim 19 wherein the computer network, the second edge bridge node, and the apparatus operating as the first edge bridge node support a Transparent Interconnection of Lots of Links ('TRILL') protocol, the legacy bridge nickname conforms to the TRILL protocol, and the ingress bridge nickname conforms to the TRILL protocol, wherein the processor is configured to route the frame through the computer network using the TRILL protocol.

22. A non-transitory computer-readable medium for routing frames in a shortest path computer network for a multi-homed legacy bridge node, the computer network including a plurality of bridge nodes, at least two of the plurality of bridge nodes operating as edge bridge nodes through which the frames ingress and egress the computer network, the computer-readable medium encoded with instructions that when executed cause one or more processors in a first edge bridge node to:

identify a legacy bridge nickname for a legacy bridge node, wherein the legacy bridge node is connected to the computer network through the first edge bridge node and a second edge bridge node using link aggregation in which at least one of a first link to the first edge bridge node and a second link to the second edge bridge node is active;

receive a frame from the legacy bridge node, wherein the frame specifies a source node address for a source node originating the frame and a destination node address for a destination node to which the frame is transmitted, and wherein the source node is connected to the network through the legacy bridge node and one of the first edge bridge node or the second edge bridge node, and the destination node is connected to the network through a third edge bridge node;

determine an egress bridge nickname for the third edge bridge node based on the destination node address;

add the legacy bridge nickname and the egress bridge nickname to the frame; and route the frame to the third edge bridge node based on the egress bridge nickname.

23. The non-transitory computer-readable medium of claim 22 wherein the instructions cause the one or more processors to add a vender header to the frame that includes the legacy bridge nickname and the egress bridge nickname.

24. The non-transitory computer-readable medium of claim 22 wherein the instructions cause the one or more processors to:

identify, based on the egress bridge nickname, a media access control ('MAC') address for a next bridge node in the network that is on a path from the first edge bridge node to the third edge bridge node;

add the MAC address for the next bridge node to the frame; and route the frame to the next bridge node based on the MAC address.

25. The non-transitory computer-readable medium of claim 22 wherein the computer network and the edge bridge nodes support a Transparent Interconnection of Lots of Links ('TRILL') protocol, the legacy bridge nickname conforms to the TRILL protocol, and the egress bridge nickname conforms to the TRILL protocol, wherein the instructions cause the one or more processors to route the frame through the computer network using the TRILL protocol.

26. The non-transitory computer-readable medium of claim 22 wherein the legacy bridge node does not support Media Access Control (MAC)-in-MAC encapsulation, wherein the instructions cause the one or more processors to route the frame through the computer network using MAC-in-MAC encapsulation.

27. The non-transitory computer-readable medium of claim 22 further comprising instructions that cause the one or more processors to process unicast frames for the legacy bridge node.

28. The non-transitory computer-readable medium of claim 22 further comprising instructions that cause the one or more processors to transmit multicast frames towards the legacy bridge node.

29. A non-transitory computer-readable medium for routing frames in a shortest path computer network for a multi-homed legacy bridge node, the computer network including a plurality of bridge nodes, at least two of the plurality of bridge nodes operating as edge bridge nodes through which the frames ingress and egress the computer network, the computer-readable medium encoded with instructions that when executed cause one or more processors in a first edge bridge node to:

identify a legacy bridge nickname for a legacy bridge node, wherein the legacy bridge node is connected to the computer network through the first edge bridge node and a second edge bridge node using link aggregation in which at least one of a first link to the first edge bridge node and a second link to the second edge bridge node is active;

receive a frame for routing to the legacy bridge node, wherein the frame specifies a source node address for a source node originating the frame and a destination node address for a destination node to which the frame is transmitted, wherein the source node is connected to the network through a third edge bridge node, and the destination node is connected to the network through the legacy bridge node and one of the first edge bridge node or the second edge bridge node, and wherein the frame also includes the legacy bridge nickname for the legacy bridge node and an ingress bridge nickname for the third edge bridge node;

remove the legacy bridge nickname and the ingress bridge nickname from the frame; and route the frame to the legacy bridge node for delivery to the destination node.

30. The non-transitory computer-readable medium of claim 29 wherein the instructions cause the one or more processors to remove a vender header that includes the legacy bridge nickname and the ingress bridge nickname from the frame.

31. The non-transitory computer-readable medium of claim 29 wherein the computer network and the edge bridge nodes support a Transparent Interconnection of Lots of Links ('TRILL') protocol, the legacy bridge nickname conforms to the TRILL protocol, and the ingress bridge nickname conforms to the TRILL protocol, further comprising instructions that cause the one or more processors to route the frame through the computer network using the TRILL protocol.

32. The non-transitory computer-readable medium of claim 29 wherein the legacy bridge node does not support Media Access Control (MAC)-in-MAC encapsulation, further comprising instructions that cause the one or more processors to route the frame through the computer network using MAC-in-MAC encapsulation.

* * * * *